United States Patent
Walker et al.

(10) Patent No.: US 7,376,580 B1
(45) Date of Patent: May 20, 2008

(54) METHOD AND APPARATUS FOR PROVIDING A BENEFIT DURING A TRANSACTION FOR USE DURING A LATER TRANSACTION

(75) Inventors: Jay S. Walker, Ridgefield, CT (US); Magdalena Mik, Greenwich, CT (US); Timothy A. Palmer, Stamford, CT (US); Russell P. Sammon, Stamford, CT (US); Michiko Kobayashi, Stamford, CT (US); Geoffrey M. Gelman, Stamford, CT (US); Miles Lasater, New Haven, CT (US); Andrew P. Golden, New York, NY (US); Keith Bemer, New York, NY (US); Scott Wolinsky, Danbury, CT (US)

(73) Assignee: Walker Digital, LLC, Stamford, CT (US)

( * ) Notice: Subject to any disclaimer, the term of this patent is extended or adjusted under 35 U.S.C. 154(b) by 683 days.

(21) Appl. No.: 09/592,618

(22) Filed: Jun. 13, 2000

(51) Int. Cl.
G06Q 30/00 (2006.01)
G06Q 20/00 (2006.01)

(52) U.S. Cl. .......................... 705/14; 705/16
(58) Field of Classification Search ............. 705/1, 705/500, 14, 26, 27, 34, 35, 37, 39, 16
See application file for complete search history.

(56) References Cited

U.S. PATENT DOCUMENTS

| | | | |
|---|---|---|---|
| 4,723,212 A * | 2/1988 | Mindrum et al. | 705/14 |
| 4,949,256 A | 8/1990 | Humble | 364/401 |
| 5,202,827 A | 4/1993 | Sober | 364/408 |
| 5,256,863 A * | 10/1993 | Ferguson et al. | 705/14 |
| 5,642,279 A | 6/1997 | Bloomberg et al. | 395/214 |
| 5,765,141 A | 6/1998 | Spector | 705/14 |
| 5,884,286 A | 3/1999 | Daughtery, III | 705/36 |
| 5,924,078 A * | 7/1999 | Naftzger | 705/16 |
| 5,970,470 A * | 10/1999 | Walker et al. | 705/14 |
| 6,014,634 A * | 1/2000 | Scroggie et al. | 705/14 |
| 6,017,063 A * | 1/2000 | Nilssen | 283/67 |
| 6,292,786 B1 * | 9/2001 | Deaton et al. | 705/14 |
| 6,332,128 B1 * | 12/2001 | Nicholson | 705/14 |
| 6,741,968 B2 * | 5/2004 | Jacoves et al. | 705/14 |
| 6,885,994 B1 * | 4/2005 | Scroggie et al. | 705/14 |

(Continued)

FOREIGN PATENT DOCUMENTS

JP 401302494 A * 12/1989

(Continued)

OTHER PUBLICATIONS

Shermack; Some Customers Willing to Pay for Priveleges; Dec. 1999; 4 pages.*

(Continued)

*Primary Examiner*—Igor N Borissov

(57) ABSTRACT

A method and apparatus for allowing a customer to purchase or otherwise receive a benefit during a first transaction that will be redeemed by the customer or provided to the customer at a later time or during a future transaction for the purchase, rental, lease, etc. of one or more products and/or services. The price to the customer for the benefit may be a monetary amount, a non-monetary amount, a commitment by the customer to complete or perform some obligation or qualifying action. The value of the benefit to the customer may be based on one or more aspects or characteristics of the first transaction.

18 Claims, 13 Drawing Sheets

U.S. PATENT DOCUMENTS

| | | | |
|---|---|---|---|
| 7,308,254 B1* | 12/2007 | Rissanen | 455/414.1 |
| 2001/0014868 A1* | 8/2001 | Herz et al. | 705/14 |
| 2002/0049617 A1* | 4/2002 | Lencki et al. | 705/4 |
| 2002/0049631 A1* | 4/2002 | Williams | 705/14 |
| 2002/0065723 A1* | 5/2002 | Anderson et al. | 705/14 |
| 2004/0133472 A1* | 7/2004 | Leason et al. | 705/14 |
| 2004/0143502 A1* | 7/2004 | McClung, III | 705/14 |
| 2005/0149402 A1* | 7/2005 | Nicholson | 705/14 |
| 2005/0234776 A1* | 10/2005 | Jacoves et al. | 705/14 |

FOREIGN PATENT DOCUMENTS

| | | | |
|---|---|---|---|
| JP | 405151465 A * | 6/1993 | |

OTHER PUBLICATIONS

Johnson; Choosing the Right Program; Jun. 1998; 5 pages.*

"Pokemon Mania Hits more.com; Free Pokemon Trading Card Game Booster Pack with $25 Purchase at the World's Largest Health, Beauty and Wellness Store" Business Wire Dec. 17, 1999.

Bunn, Austin, "How It Works: Starved for Attention" The Ethicist, The New York Times Magazine Feb. 13, 2000.

U.S. Appl. No. 09/221,457, entitled "Method and Apparatus for Determining a Subscription to a Product in a Retail Environment" filed Dec. 28, 1998.

U.S. Appl. No. 09/285,201, entitled Method and Apparatus for the Presentation and Redemption of Reward Offers filed Apr. 1, 1999.

U.S. Appl. No. 09/409,041, entitled "Systems and Methods to Provide a Product to a Customer Before a Final Transaction Term Value is Established" filed Sep. 29, 1999.

U.S. Appl. No. 09/538,805, entitled "Method and Apparatus for Managing Subscriptions" filed Mar. 30, 2000.

* cited by examiner

| PRODUCT/ SERVICE IDENTIFIER 300 | PRODUCT/ SERVICE DESCRIPTION 302 | AMOUNT CHARGED TO PROTECT AGAINST PRICE INCREASES 304 | RETAILER SUBSIDY 306 | MANUFACTURER SUBSIDY 308 | MARGIN 310 |
|---|---|---|---|---|---|
| P-P2453 | GRANNY SMITH APPLES | $0.08 | $0.10 | $0.00 | $0.03 |
| P-C6503 | CAMPBELL'S TOMATO SOUP | $0.03 | $0.00 | $0.05 | $0.03 |
| P-D8562 | CREST TOOTHPASTE | $0.05 | $0.03 | $0.02 | $0.04 |
| P-G7589 | RAGU PASTA SAUCE | $0.04 | $0.00 | $0.01 | $0.04 |
| P-S6242 | CHEERIOS 32 OZ. | $0.05 | $0.00 | $0.25 | $0.05 |
| S-J9168 | DRY CLEANING 1 SHIRT | $0.15 | $0.10 | N/A | $0.05 |
| S-K0706 | OIL CHANGE 1 CAR | $1.00 | $0.50 | N/A | $1.00 |

FIG. 4

PRICE GUARANTEES ~266

| CUSTOMER IDENTIFIER 350 | PRODUCT/ SERVICE IDENTIFIER 1 352 | PRICE 1 356 | QUANTITY 1 360 | PRODUCT/ SERVICE IDENTIFIER 2 354 | PRICE 2 358 | QUANTITY 2 362 | BENEFIT EXPIRATION 364 |
|---|---|---|---|---|---|---|---|
| C-253640 | P-G7589 | $2.79 | 1 | P-D8562 | $2.89 | 1 | 8/22/00 |
| C-734507 | P-P2453 | $1.49 | 2 | P-S6242 | $4.19 | 1 | 8/19/00 |
| C-834663 | P-G7589 | $2.69 | 1 | P-D8562 | $2.89 | 3 | 8/17/00 |
| C-783467 | P-S6242 | $4.09 | 2 | N/A | N/A | N/A | NONE |
| C-783467 | P-P9861 | $2.75 | 3 | N/A | N/A | N/A | NONE |

| CUSTOMER IDENTIFIER 400 | CUSTOMER NAME 402 | CONTACT INFORMATION 404 | PAYMENT IDENTIFIER 406 |
|---|---|---|---|
| C-123654 | BILL JOHNSON | BJOHNSON@ACME.COM | P-763981 |
| C-876567 | SUE JONES | (203) 555-0000 | P-281650 |
| C-431789 | BOB SMITH | 274 RED RIDGE WAY STAMFORD, CT 06905 | P-705223 |

METHOD AND APPARATUS FOR PROVIDING A BENEFIT DURING A TRANSACTION FOR USE DURING A LATER TRANSACTION

CROSS-REFERENCE TO RELATED INVENTIONS

The method and apparatus of the present invention are related to the subject matter disclosed in co-pending and commonly assigned U.S. patent application Ser. No. 09/409,041 entitled SYSTEMS AND METHODS TO PROVIDE A PRODUCT TO A CUSTOMER BEFORE A FINAL TRANSACTION TERM VALUE IS ESTABLISHED, U.S. patent application Ser. No. 09/285,201 entitled METHOD AND APPARATUS FOR THE PRESENTATION AND REDEMPTION OF REWARD OFFERS, U.S. patent application Ser. No. 09/221,457 entitled METHOD AND APPARATUS FOR DETERMINING A SUBSCRIPTION TO A PRODUCT IN A RETAIL ENVIRONMENT, and U.S. patent application Ser. No. 09/538,805 entitled METHOD AND APPARATUS FOR MANAGING SUBSCRIPTIONS, the contents of all of which are incorporated herein by reference for all purposes.

BACKGROUND OF THE INVENTION

1. Field of the Invention

This invention relates generally to a method and apparatus for conducting a transaction and, more particularly, to a method and apparatus for conducting a first transaction during which a customer or other user purchases a benefit that may be applied at or during a later second transaction.

2. Description of the Prior Art

A retailer often encourages customers to shop at the retailer by assuring the customers that they are getting competitive prices for the products and services the customers are purchasing at the retailer. Customers often care about prices they are paying for products and services, and the customers may be discouraged from shopping at the retailer if prices for products or services sold at or by the retailer are volatile (i.e., the prices change frequently and/or significantly), if the customers feel that they are not getting a competitive price at the retailer for products or services, or the customers cannot be guaranteed that they will receive or obtain a competitive price for a product or service. In addition, in many cases the retailer also would like to have an effective way to encourage its customers to return to the retailer to conduct future transactions or to make future purchases.

There are several methods that retailers use to try to alleviate customers' concerns about price changes. For example, a retailer may provide a price guarantee to a customer where the retailer guarantees to the customer that the retailer will refund the difference between the price the customer paid the retailer for a product or service and an advertised price for the product or service if the customer finds a lower advertised price for the same product or service. A retailer may also agree to refund to a customer an amount of a decrease in price for a product or service if the product or service decreases in price during a given time period (e.g., thirty days) after the customer purchases the product or service. As another example, if a retailer is out of stock of a product that is on-sale, the retailer may provide a "rain check" to the customer for the product. The rain check may comprise an agreement or promise by the retailer that the customer will still be able to purchase the product at a future time at the price that is being offered when the retailer issues the rain check, even if the price of the product changes (e.g., increases) between the time the customer obtains the rain check and the time the customer purchases the product.

When possible, retailers also encourage customers to visit their store at later days or times to conduct additional transactions to make additional purchases. A technique currently used in the grocery or food product industry to encourage repeat visits by a customer comprises providing a checkout coupon to the customer. For example, a grocery store may give the customer a coupon at the time of the customer's checkout that would provide a discount to the customer on a price for a product purchased by the customer during a fixture transaction. However, in most cases such a checkout coupon does not provide a guarantee to the customer that the customer will receive a specific price for the product during the future transaction.

Despite the state of the art in transaction systems, there exists a need for an apparatus and method that encourages a customer to return to a retailer and/or to conduct a future transaction with or at the retailer while providing some assurance to the customer that the customer will not be subjected to price increases for one or more specific products or services.

SUMMARY OF THE INVENTION

Accordingly, it is an object of the present invention to provide a method and apparatus for allowing a customer to purchase or otherwise receive a benefit during a first transaction that will be redeemed or applied by or for the customer or another person or entity or provided to the customer or the other person or entity at a later time or during a future transaction for the purchase, rental, lease, etc. of one or more products or services. The benefit may provide a price guarantee for the customer during the purchase of one or more products and/or services in a future transaction. Thus, by purchasing the benefit during a current transaction, the customer knows the customer has locked in a price for the product(s) and/or service(s) purchased by the customer during the future transaction.

The price charged to or paid by the customer during the current transaction for the benefit may be a monetary amount, a non-monetary amount, a commitment by the customer to complete or perform some transaction, obligation or qualifying action, etc. The benefit may be based on one or more aspects or characteristics of the first transaction.

Additional objects, advantages, and novel features of the invention shall be set forth in part in the description that follows, and in part will become apparent to those skilled in the art upon examination of the following or may be learned by the practice of the invention. The objects and the advantages may be realized and attained by means of the instrumentalities and in combinations particularly pointed out in the appended claims.

To achieve the foregoing and other objects and in accordance with the purposes of the present invention, as embodied and broadly described herein, a method for conducting a transaction in accordance with the principles of the present invention includes receiving information relating to at least one transaction, determining a benefit, determining a price for the benefit, and applying the benefit during a second transaction.

In another embodiment, a method for conducting a transaction in accordance with the principles of the present invention includes receiving transaction information, determining a benefit and a qualifying action associated with the benefit, the benefit based at least in part on the transaction information, and determining a price for the benefit.

In another embodiment, a method for conducting a transaction in accordance with the principles of the present invention includes providing information relating to at least one transaction, receiving an indication of a benefit, and receiving an indication of a price for the benefit.

In addition to the above, to achieve the foregoing and other objects and in accordance with the purposes of the present invention, as embodied and broadly described herein, an apparatus for conducting a transaction in accordance with the principles of the present invention includes a memory, a communication port, and a processor connected to the memory and the communication port, the processor being operative to receive information relating to at least one transaction, determine a benefit, and determine a price for the benefit.

BRIEF DESCRIPTION OF THE DRAWINGS

The accompanying drawings, which are incorporated in and form a part of the specification, illustrate the embodiments of the present invention, and together with the descriptions serve to explain the principles of the invention.

In the Drawings:

FIG. 4 is a tabular representation of a possible data structure for the product/service database of FIG. 3;

FIG. 5 is a tabular representation of a possible data structure for the benefits database of FIG. 3;

FIG. 6 is a tabular representation of a possible data structure for the customer database of FIG. 3;

DETAILED DESCRIPTION OF THE EMBODIMENTS

Figure 1:
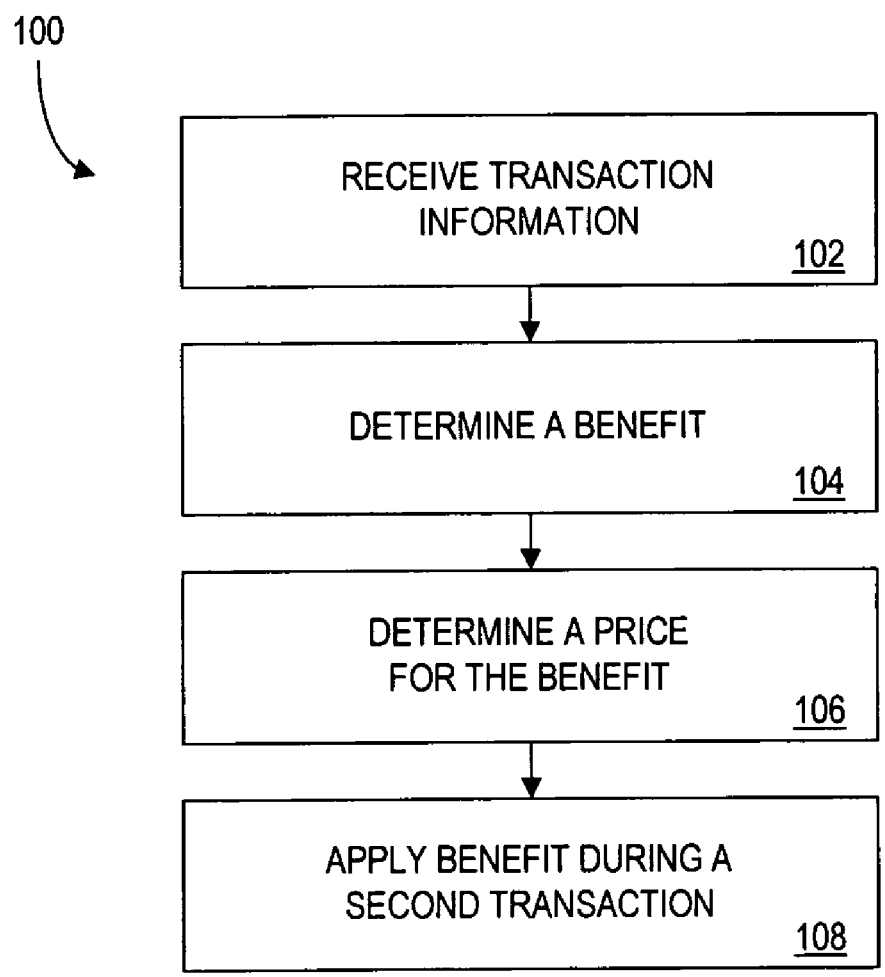
FIG. 1 is a flowchart of a first embodiment of a method in accordance with the present invention.

A first embodiment 100 of a method in accordance with the principles of the present invention is illustrated in FIG. 1. The method 100 allows a customer or user to initiate, conduct, participate in and/or complete a first transaction during which, or as part of which, a benefit is determined or identified that the customer may purchase, receive or otherwise obtain for a determined price and then apply to a future transaction conducted by, for or under the control of the customer or some other entity, person, etc. designated or identified by the customer or some other person, entity or device. The first transaction being conducted by the customer may relate to the purchase, rental, lease, etc. of one or more products or services, a collection or "shopping list" of products or services, etc.

The benefit purchased by the customer during the first transaction may provide the customer with a guaranteed or "locked-in" price for one or more products and/or services purchased by the customer during the future transaction, thereby protecting the customer against price increases for the products and/or services purchased during the future transaction for which the benefit is applied. As a result, the customer knows the maximum price that the customer will have to pay for the products and/or services during the future transaction, thereby reducing any price uncertainty or concern about future price increases that the customer may have. For example, during a first transaction a customer may purchase product A for two dollars and product B for four dollars. The customer may also purchase a benefit for fifty cents that enables the customer to purchase products A and B during a later second transaction at the same prices the customer is purchasing the products A and B at during the first transaction (i.e., two dollars for product A and four dollars for product B). Thus, the benefit purchased for fifty cents by the customer guarantees or "locks in" the price of the product A at two dollars and the price of the product B four dollars or the later second transaction, even if the prices of the products A and B individually or collectively increase after the first transaction.

The term "customer" as used herein should be construed broadly and no specific limitation or definition is implied by use of the term "customer." In addition, the term "customer" should include any user, shopper, transaction participant, etc.

The method 100 may be used in an online implementation, such as when a customer purchases one or more products and services via a World Wide Web site, and/or in a retail or in-store implementation, such as when a customer is in a retail store and purchases one or more products or services at a point-of-sale device (e.g., a cash register), or through interaction with a cashier, check-out clerk, store employee, etc.

The method 100 illustrated in FIG. 1 preferably includes a step 102 during which transaction information is received from a customer, a customer or client device, a retailer, a retailer device (e.g., a point-of-sale terminal), etc. relating to the purchase, rental, lease, etc. of one or more products or services. Transaction information received during the step 102 may include the product(s) and/or service(s) involved in the transaction and their quantities, the prices for product(s) and/or service(s) involved in the transaction, a customer identifier, a retailer or store identifier, the time and/or date of the transaction, a method of payment or a payment identifier, etc.

When the method 100 is used in an online implementation, the transaction information may be sent by a customer using a customer or client device, such as a desktop or laptop computer, to access a World Wide Web site. The World Wide Web site may be operated, controlled, etc. by a server or other controller that receives the transaction information from the customer via the customer device. When the method 100 is used in a retail or in-store implementation, the transaction information may be received from a customer standing in a check-out line or at a retailer device, such as a point-of-sale terminal, by either a cashier, check-out clerk, store employee, etc. or the retailer device. The retailer device may be located at the check-out line and operated or used by the cashier, check-out clerk, store employee, etc.

The method 100 also may include a step 104 during which a benefit is selected, identified or otherwise determined by a controller, a retailer, a retailer device, a manufacturer, a manufacturer device, a customer, a customer or client device, etc. The benefit determined during the step 104 may be based in whole or in part on one or more aspects or characteristics of the customer, the transaction, the transaction information received during the step 102, etc. A benefit may be or include many things such as, for example, a guarantee of a specific price for one or more products and/or services purchased during a later transaction, a price discount off one or more products and/or services purchased, rented, leased, etc. in the future, a price discount off of a "shopping list" or other collection or set of products or services, a rebate, a lower interest rate on a credit card to be used on a future transaction, etc. The benefit determined during the step 104 may be provided or offered for sale to the customer and may provide value, savings, reward, etc. to the customer, another person or entity designated by the customer, another person or entity designated by a retailer, controller, manufacturer or other third party, etc.

When the method 100 is used in the online implementation discussed above, the server or other controller operating the World Wide Web site and receiving the transaction information during the step 102 may also determine the benefit during the step 104. The server or other controller may also send a message or other communication to a customer regarding the benefit determined during the step 104. When the method 100 is used in a retail or in-store implementation as previously discussed above, a cashier, check-out clerk, store employee, etc. or a retailer device may determine the benefit during the step 104. If desired, the cashier, check-out clerk, store employee, or retailer device may audibly or visually communicate the benefit to a customer.

The method 100 may include a step 106 during which a price is selected, identified, or otherwise determined by a controller, a retailer, a retailer device, a customer, a customer device, etc. for the benefit determined during the step 104. The "price" determined during the step 106 for the benefit determined during the step 104 may be a monetary amount, a non-monetary amount (e.g., frequent flyer miles, long distance telephone calling time, frequent shopper points, tokens, etc.), or a commitment, promise or agreement by the customer to complete or perform some future transaction, obligation or qualifying action. In some embodiments a price may be determined to be zero.

A qualifying action may include an agreement by the customer or a requirement for the customer to purchase a specific product at a specific retailer, an agreement by the customer or a requirement for the customer to purchase a specific product by a specific date, an agreement by the customer or a requirement for the customer to conduct a specific or unspecified transaction, an agreement by a customer or a requirement for the customer to purchase a specific product or service during a future transaction, an agreement by a customer or a requirement for the customer to accept a specific magazine subscription, an agreement by the customer or a requirement for the customer to use a specific credit card during one or more future transactions, an agreement by a customer to answer one or more survey questions, an agreement by a customer or a requirement for the customer to stay at a specific hotel or fly with a specific airline the next time the customer travels, etc. If the customer does not complete a qualifying action associated with a benefit, a penalty may be imposed or levied against the customer.

The method 100 may include a step 108 during which the benefit determined during the step 104 is applied during a second transaction. The benefit may be applied during the step 108 for a customer involved in a first transaction for which transaction information was received during the step 102. Alternatively, the benefit may be applied during the step 108 during a transaction participated in by a person other than the customer involved in the first transaction. The benefit may be applied during the second transaction by a controller or other retailer device during the step 108 assuming that the benefit determined during the step 104 has been purchased during the first transaction by a customer. In some embodiments, the benefit applied in the second transaction may be sold or otherwise provided to the customer during the first transaction for use by the customer in the second transaction.

When the method 100 is used in the online implementation discussed above, the server or other controller operating the World Wide Web site and receiving the transaction information during the step 102 may also determine the price for the benefit during the step 106. The server or other controller may also send a message or other communication to a customer regarding the benefit price determined during the step 106. When the method 100 is used in the retail or in-store implementation previously discussed above, a cashier, check-out clerk, store employee, etc. or a retailer device may determine the price for the benefit during the step 106. If desired, the cashier, check-out clerk, store employee, or retailer device may communicate the benefit price to a customer.

The method 100 and each of the steps 102, 104, 106, 108 will be discussed in further detail below.

A significant advantage of the method 100 of the present invention is that manufacturers and suppliers of products and services can target customers to receive benefits, encourage consumption or purchase of their products and services by reducing price and other uncertainty that customers may have, and receive commitments from customers to purchase their products and services in the future. Customer price uncertainty often results from actual, perceived, or expected price volatility or fluctuation for products or services by the customers. The method 100 recognizes and makes use of the fact that customers are often concerned about price volatility and may be willing to purchase a benefit that guarantees that they can purchase a product or service in the future at a price that is less than, equal to, or no more than a fixed amount or a percentage higher than the price the customer is paying, or a merchant is offering, for the product or service in a current transaction.

Another significant advantage of the method 100 of the present invention is that retailers are provided with an effective way to encourage customers to return to their stores and to purchase products or services or otherwise engage in transactions in the future. In addition, retailers may receive added revenue from selling benefits to customers. The retailers may also encourage customers to purchase products or services sooner rather than later in hopes of locking or guaranteeing a price for the products or services.

A third significant advantage of the method 100 of the present invention is that customers purchasing, renting, leasing, etc. products and services may have a way to decrease any price uncertainty for the products and services that they have, while guaranteeing that the customers will not pay a higher price for the products and services if prices for such products and services increase in the future. In addition, customers may receive rewards or benefits for being loyal shoppers at a retailer or purchasers of products or services from a manufacturer or supplier. These and other benefits of the method 100 will be discussed in further detail below.

Figure 2:
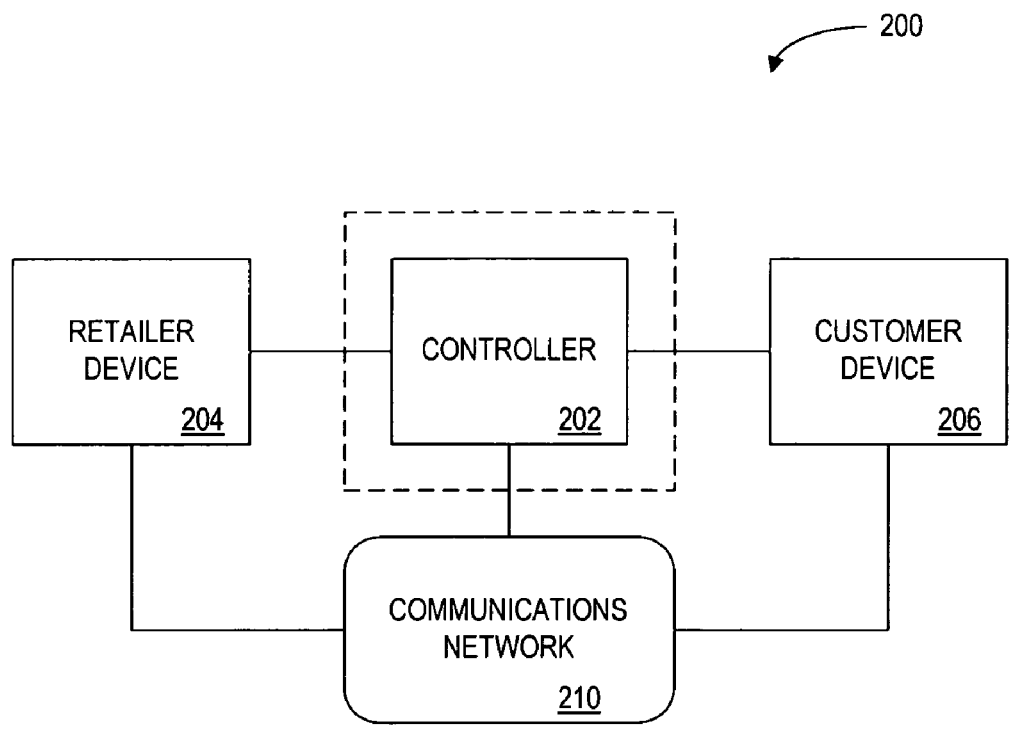
FIG. 2 is a block diagram of system components for an embodiment of an apparatus usable with the method of FIG. 1.

Now referring to FIG. 2, an apparatus or system 200 usable with the method 100 is illustrated. The apparatus 200 includes a controller 202 that may communicate with one or more retailer devices 204 and one or more customer, user, or client devices 206 directly, or indirectly via a computer, data, or communications network 210. The controller 202 may comprise one or more computing devices located in the same location or in different locations.

The controller 202 may perform the steps 102, 104, 106 and 108 of the method 100 and receives information and data regarding transactions, benefits, customers, products, services, etc. from retailer devices, such as the retailer device 204, customers or users, customer or client devices, such as the customer or client device 206, retailers, retailer devices, etc. In some embodiments, either a retailer device and/or a customer device may complete or partially perform some or all of the steps 102, 104, 106 and 108. If desired, the controller 202, the retailer device 204 and the customer device 206 may also be directly or indirectly connected to, or otherwise in communication with, other devices, via the communications network 210.

The controller 202 may operate, use or control a World Wide Web site, electronic bulletin board, etc. for an online implementation of the method 100. Alternatively, the controller 202 may be located in a retail store, or accessible from a point-of-sale device or other device in the retail store, for a retail or in-store implementation of the method 100. The structure, operation and use of the controller 202 will be discussed in additional detail below.

The retailer device 204 may be located at a retailer or store, a mall, a trade show, check-out line, etc. where a customer might initiate, participate in, conduct or complete a transaction for the purchase, rental, lease, etc. of one or more products or services. A retailer device can be a point-of-sale terminal, a networked or electronically connected group of point-of-sale terminals, a cash register, etc. A retailer device may comprise one or more computing devices located in the same location or in different locations.

A retailer device may provide or receive the transaction information received during the step 102. In addition, a retailer device may determine a benefit during the step 104 and the price for the benefit during the step 106. Alternatively, a retailer device may receive or generate information regarding the benefit determined during the step 104 and the price for the benefit determined during the step 106. In some embodiments, transaction information received or generated by a retailer device may be under the direction or control of a check-out clerk, cashier, store employee, customer, etc. In some embodiments, a retailer device may have one or more unique identifiers or codes associated with it. An identifier may identify a specific retailer device, a retailer at which a retailer device is located, a specific connection to the communications network 210, etc. In some embodiments, a retailer device may also function as the controller 202 or a controller of other retailer devices.

In general, a retailer device will be used in a retail or in-store implementation of the method 100 and will reside in a retail store or be used by customers, check-out clerks, cashiers, store employees, etc. in the retail store when one or more products or services is being purchased by a customer in the retail store. The structure, operation and use of a retailer device will be discussed in additional detail below.

The customer or user device 206 preferably allows a customer or user to interact directly or indirectly with the controller 202, point-of-sale terminals and other retailer devices and the remainder of the apparatus 200. A customer may use a customer or user device to provide or transmit transaction information received by the controller 202 or a retailer device during the step 102. In addition, a customer device may receive or generate information regarding the benefit determined by the controller 202 or a retailer device during the step 104 and the price for the benefit determined by the controller 202 or a retailer device during the step 106. In some embodiments, a customer device may have one or more unique identifiers or codes associated with it. An identifier may identify a specific customer, a specific customer device, a specific connection to the communications network 210, etc. Possible customer devices include a personal or portable computer, network terminal or server, fixed or mobile user station, workstation, telephone, beeper, kiosk, dumb terminal, personal digital assistant or other hand-held device, facsimile machine, etc.

A customer device 202 may be used to access a World Wide Web site, electronic bulletin board, etc. in an online implementation of the method 100. The World Wide Web site, electronic bulletin board, etc. may be operated, used or controlled by the controller or server 202. Thus, a customer may use the customer device 202 to provide messages, email transmissions, indications, transaction information, etc. to the controller 202 and to receive information from the controller 202, such as the information regarding the benefit determined during the step 104 and the price for the benefit determined during the step 106. A customer device may or may not be used in a retail or in-store implementation of the method 100. The structure, operation and use of a customer device will be discussed in additional detail below.

The communications network 210 might be the Internet, the World Wide Web, or some other public or private computer or communications network or intranet, as will be described in further detail below. The communications network 210 illustrated in FIG. 2 is only meant to be generally representative of cable, computer or other communication networks for purposes of elaboration and explanation, but not limitation, of the present invention and other devices, networks, etc. may be connected to the communications network 210 without departing from the scope of the present invention. The communications network 210 is also intended to be representative of, and include all or a part of, the Internet, the World Wide Web, and other privately or publicly operated networks. The communications network 210 may also include other public and/or private wide area networks, local area networks, data communication networks or connections, intranets, routers, satellite links, microwave links, cellular or radio links, fiber optic transmission lines, ISDN lines, T1 lines, DSL, etc.

Now referring again to FIG. 1, the method 100 and the steps 102, 104, 106 and 108 will be discussed in more detail in relation to the system 200 illustrated in FIG. 2. As previously discussed above, the method 100 preferably is used during, or as part of, a transaction during which a customer is purchasing one or more products and/or services or arranging for the purchase of one or more products and/or services.

The method 100 includes a step 102 during which information relating to a transaction is received or obtained directly or indirectly from a customer or customer device or a retailer device. While the transaction information preferably will be received or obtained during the step 102 by the controller 202 directly or indirectly from a customer or customer device in an online implementation of the method 100, the transaction information may also be received by the controller 202 from a retailer device, a cashier, check-out clerk or other store employee at a retailer device, or some other device in retail or in-store implementation of the method 100. In addition, in some embodiments of a retail or in-store implementation of the method 100, a retailer device will receive transaction information during the step 102 directly or indirectly from a customer, customer device, cashier, check-out clerk, store employee, etc. and may or may not forward such transaction information to the controller 202. For example, the transaction information may be received by a cashier from a customer in a check-out line, and then entered by the cashier into a retailer device. Alternatively, the retailer device may automatically ascertain or determine some or all of the transaction information during bar code scanning by the cashier of the products being purchased by the customer at the retailer device.

The benefit determined during the step 104 may be based, in whole or in part, on some aspect of the transaction for which information is received during the step 102 or on the transaction information itself received during the step 102. The transaction information received during the step 102 can include a customer identifier, a customer device identifier, a retailer device identifier, preference information for a customer, credit history of a customer, characteristics of a customer, customer demographic information, information regarding a customer's brand, product or service loyalty or preference, information regarding a customer's brand, product or service indifference, a product identifier, a stock keeping unit (SKU), a service identifier, an amount of change due a customer as a result of the transaction, product quantity information, a price for a product or products being purchased during the transaction, a price for a service or services being purchased during the transaction, date or time information for the transaction, a customer's request for a benefit, etc.

After the transaction information is received during the step 102, one or more benefits preferably are determined or otherwise selected during the step 104. While the step 104 preferably is completed by the controller 202, particularly in an online implementation of the method 100 where a customer uses a customer device to access or log onto a World Wide Web site controlled, used, or operated by the controller 202, the step 104 may be completed by a customer device 206, the controller 202, a retailer device 204, and/or another device. In addition, the determination of a benefit during the step 104 may be controlled, accessed, approved, overseen, identified, guided, etc. by a cashier, check-out clerk, store employee, customer, etc. at a retailer device in a retail store during a retail or in-store implementation of the method 100 where a customer is purchasing one or more products or services in the retail store and, presumably, at the retailer device.

As previously discussed above, a benefit determined during the step 104 may be provided or offered for sale to the customer and may provide value, savings, reward, etc. to the customer, another person or entity designated by the customer, another person or entity designated by a retailer, controller, manufacturer or other third party, etc. For example, in an online implementation of the method 100, the controller may send a message to a customer via a customer device that contains an offer for sale of the benefit to the customer. In a retail or in-store implementation of the method 100, a retailer device, or a cashier, check-out clerk or store employee at the retailer device, may indicate, display or otherwise provide the offer for sale of the benefit to the customer.

In some embodiments, a customer may pay for or otherwise obtain a benefit determined during the step 104 but the recipient of the benefit may be a person or entity other than the customer. Such other person or entity may be selected, identified, determined, etc. by the customer, a customer device, the controller 202, a retailer device, a retailer, or some other third party.

In other embodiments, a benefit determined during the step 104 and purchased by a customer may be transferable by the customer or usable, accessible or shared by more than one person or group. For example, a customer may purchase a benefit determined during the step 104 that can be shared by more than one person. The group benefit may be associated with a benefit identifier, frequent shopper card, group identifier, etc. that can be used by any person in the group to access, use, redeem, apply, etc. the benefit. Alternatively, the customer may provide an identifier for each person in the group to access, use, redeem, etc. the benefit. A group benefit might allow each person in the group to buy a certain number of products (e.g., cartons of milk, gallons of gasoline, airline tickets, etc.) for a certain price, the group as a whole to purchase a total number of products for a certain price regardless of how many products individual members of the group purchase, each person in the group to receive a flat discount on purchases of certain products, each person in the group to receive a discount on all products purchased at a designated retailer, etc. Retailers or manufacturers may allow or provide a group benefit purchased by a customer as a way to have the customer encourage or motivate other people to shop at the retailer instead of the retailer's competitors, buy the manufacturer's products instead of the manufacturer's competitors' products, etc. Thus, the customer becomes a promoter or advertiser of the retailer or manufacturer and helps the retailer or manufacturer maintain the loyalty of current customers and acquire new or additional customers. In some embodiments, a customer might select or identify the members of a group to receive a benefit purchased or acquired by a group. In other embodiments, the controller 202, a retailer, manufacturer, retailer device, manufacturer device, etc. may designate or approve who may be allowed into a group to receive a benefit. For example, a retailer may limit members of the group to family members of a customer purchasing a group benefit, to a fixed number of people designated by the customer, to people who are not current customers of the retailer, to people who live within a designated geographic area surrounding the retailer, to people who live outside a designated geographic area surrounding the retailer, to people who have good credit ratings, people who fit a designated demographic profile, etc. In some embodiments, a benefit received by a customer may vary depending on how many people in the group redeem their authorized benefits, thereby motivating the customer to encourage the members of the group to redeem their benefits. Upon selection or designation of a group of people to receive a benefit purchased by a customer, the customer, the controller 202, a retailer, retailer device, etc. may provide an indication or message to each member of the group that they are entitled to receive a benefit. Such indication or message may be transmitted or provided via telephone call, facsimile, email, etc.

As previously discussed above, the benefit determined during the step 104 may be based, in whole or in part, on some aspect of the transaction for which information is received during the step 102 or on the transaction information itself received during the step 102. Therefore, a customer may relate the benefit determined during the step 104 with the transaction being conducted or participated in by the customer. In some embodiments, customers may be encouraged to increase the value of their transactions in hopes of receiving more valuable benefits.

In simple embodiments, only one type of benefit is determined during the step 104 or otherwise offered for sale to the customer (e.g., a guarantee that the prices paid for at least one of the products and services in the customer's next visit or transaction will not be higher than prices paid on a customer's current visit or during the customer's current transaction). In such embodiments, determining the benefit may include determining which products and services and prices are to be included in the price guarantee for the benefit. A customer may request a price guarantee for one or more products and/or services or provide an indication of the products and/or services for which the customer would like to receive a price guarantee. In other embodiments, a benefit may be determined by random selection from a list of benefits or based on results of a game of skill or chance played by the customer.

In other embodiments, there may be other benefits determined besides a price guarantee as the benefit determined during the step 104. For example, a benefit may include a guarantee to a customer that the customer will receive the same amount of savings, discount, rebate, etc. on the customer's next transaction that the customer received or is receiving on the transaction for which information was received during the step 102, regardless of the products and/or services purchased by the customer in the current transaction and in the customer's next transaction. As another example, a benefit determined during the step 104 may include a guarantee to a customer that the customer will receive the same total price for the same products and/or services on the customer's next transaction that the customer received or is receiving on the transaction for which information was received during the step 102. As a third example, a benefit determined during the step 104 may include a guarantee to a customer that the customer will receive a certain percentage savings on a future transaction or a predetermined or "locked-in" price for a product or service purchased during the future transaction. In some embodiments the benefits may be usable by a customer at a designated retailer, one of a plurality of designated retailers, all of the retailers in a mall or shopping center, any retailer in a chain of retailers, any retailer participating in a specific promotion, any retailer linked to the controller 202, etc. In addition, benefits may be provided or applied in conjunction with one or more participating retailers, or separate from any program, promotion, etc. being operated by one or more retailers.

In some embodiments, a customer may purchase a manufacturer's product(s) during a first transaction at a retailer and not purchase a benefit at the time of that transaction. The customer may then later log onto or access a World Wide Web site administered or operated by or for the manufacturer and enter information regarding the product purchase (e.g., price paid by the customer for the product, a product identifier, a retailer identifier, etc.). The customer may then purchase a benefit relating to the first transaction or based on the product(s) purchased during the first transaction that will be used by the customer during a later transaction conducted by the customer.

Many other types of benefits are possible. For example, a benefit determined during the step 104 may include one or more of the following: a discount off a future purchase of one or more products and/or services, a monetary or non-monetary amount that is dependent at least in part on when the benefit is redeemed or applied, a monetary or non-monetary amount dependent at least in part on where the benefit is redeemed or applied, a monetary or non-monetary amount dependent at least in part on who redeems the benefit, a monetary or non-monetary amount dependent at least in part on how the benefit is redeemed or applied, a monetary or non-monetary amount dependent at least in part on a financial account (e.g., credit card, debit card, checking account, etc.) or payment identifier used to redeem the benefit, a discount off any purchase of a product or service made at a designated retailer, a code or instruction telling a customer how to obtain or apply a benefit, a rebate, a multiplier of a retailer or manufacturer provided discount or rebate, a multiplier of a previously determined benefit, and/or an aggregator of at least two previously provided benefits, guarantee of a price, a guarantee that a sales or other tax rate applied to a future transaction will not increase, discount, etc. for a product or service related or similar to a product or service being purchased in the current transaction. Non-monetary benefits include frequent flyer miles, frequent shopper points, tokens, free or reduced-rate long distance calling time, etc. In some embodiments, a benefit might be the aggregation or collection and replacement of previously awarded, purchased or otherwise obtained benefits.

In some embodiments a benefit may be associated with or related to a "shopping list" or other collection of products and/or services. Thus, a benefit may be a guarantee of a maximum price for a collection of products and/or services, a guarantee of a total price (which could be pre-tax or post-tax) for a collection of products and/or services, a discount off a purchase of a collection of products and/or services, etc.

The benefit determined during the step 104 may have one or more restrictions, conditions or qualifying actions associated or established with it. Such association or establishment of a condition or restriction preferably is completed by the controller 202, but may be completed by a customer device, a customer, a retailer device, a cashier, check-out clerk or store employee located at a point-of-sale terminal or other retailer device, and/or an other device. In addition, while such association or establishment of a condition or restriction associated with a benefit may be completed as part of the step 104, it also may be initiated or completed as a separate step if desired. Determination of a condition associated with a benefit may be completed by querying or accessing a benefit database that stores information relating to such conditions or restrictions. In addition, a determination of a condition associated with a benefit may be completed by querying or accessing a retailer and/or a manufacturer database or negotiating with a retailer, retailer device, manufacturer, manufacturer device, etc. Restrictions or conditions may be based on, or result from, current or expected inventory amounts of products and/or services by a retailer or manufacturer, a customer's purchasing or credit history, a retailer or manufacturer promotion or sale, the occurrence of a holiday, etc.

Restrictions, conditions or qualifying actions on or associated with a benefit determined during the step 104 may vary. For example, the benefit may only be valid for a designated period of time (e.g., two weeks after being provided or sold to a customer), the benefit may only be valid during a designated period of time (e.g., from Nov. 1, 2005, to Dec. 1, 2005), the benefit may only be valid for a certain number of future transactions, (e.g., the next two transactions conducted by a customer), the benefit may only be valid for certain quantities of products (e.g., twice the quantities or amounts of products purchased in the current transaction), the benefit may only be valid for transactions conducted at a specific retailer, the benefit may not be transferable by a customer to someone else, the benefit may only be usable by a person other than the customer, the benefit may only be used in conjunction with a designated method of payment (e.g., a designated credit card, any credit or debit card, a check, a money order, etc.), the benefit may only be valid for certain products or services (e.g., the products or services identical to the products or services purchased or being purchased in the current transaction, non-sale items, high-inventory items, produce only, etc.), the benefit may be valid only on certain days or times (e.g., next Friday, Tuesday mornings, after noon, etc.), the customer may be required to purchase one product or service to receive a benefit applied to the customer's purchase of a different product or service, receiving a benefit may require that the customer purchase one or more products or services during the current transaction, a benefit may provide a maximum amount of savings, a benefit may change over time (e.g., the benefit may provide a lower savings the later it is redeemed), the benefit may include an element of chance which might change the value of the benefit, how, where or when the benefit can be redeemed or received, etc.

In some embodiments, a customer may be offered a choice, list, menu, etc. of benefits from which to choose. In other embodiments, a customer may be allowed to negotiate for a desired benefit, request a specific benefit, or even name or designate the benefit. In some embodiments, an indication of a benefit may be provided to a customer, a customer device, a retailer, a retailer device, etc. or printed on a receipt provided to a customer, retailer, etc. If desired, a customer, customer device, retailer device, controller, retailer, etc. may be able to access or learn about benefits that have been purchased by customers, awarded or sold to customers, etc., perhaps by accessing a database, the controller 202, a World Wide Web site, an electronic bulletin board, an integrated voice response unit, etc. A customer device and/or retailer device may also store information regarding a benefit determined during the step 104.

After a benefit is determined during the step 104, a price for the benefit preferably is determined during the step 106. While the step 106 preferably is completed by the controller 202 in an online implementation of the method 100, the step 106 may be completed by a customer device 206, the controller 202 a retailer device 204, a cashier, check-out clerk or store employee located at a point-of-sale terminal or other retailer device 204, and/or another device in a retail or in-store implementation of the method 100. In addition, the determination of a price for a benefit during the step 106 may be controlled, accessed, approved, identified, guided, etc. by a cashier, check-out clerk, store employee, customer, etc. at a retailer device 204 in a retail store during a retail or in-store implementation of the method 100 where a customer is purchasing one or more products or services in the retail store and, presumably, at the retailer device 204.

The price to a customer for the benefit determined during the step 104 preferably is based on various factors, including the type of benefit being offered. A price for a benefit may include a monetary amount, a non-monetary amount (e.g., frequent flyer miles, frequent shopper points, etc.), a commitment or promise from a customer to complete a designated qualifying action, an agreement by a customer to complete a future transaction, an agreement by a customer to purchase a particular or supplemental product or service during a current transaction, an agreement or willingness by a customer to purchase a product or service at a designated retailer, an agreement by a customer to purchase a product or service by a specific date, an agreement by a customer to purchase a product or service within a specific period of time, an agreement by a customer to accept a cross-subsidy offer (e.g., a magazine subscription, a switch in long distance telephone service providers, etc.), an agreement by a customer to use a designated financial account (e.g., credit card, debit card, frequent shopper card, etc.) during a future transaction, etc. The concept, operation and use of cross-subsidies are described in pending U.S. patent application Ser. No. 09/274,281 entitled METHOD AND APPARATUS FOR PROVIDING CROSS-BENEFITS VIA A CENTRAL AUTHORITY, and U.S. patent application Ser. No. 09/282, 747, entitled METHOD AND APPARATUS FOR PROVIDING CROSS-BENEFITS BASED ON A CUSTOMER ACTIVITY, all of both of which are incorporated herein by reference.

Some of the factors used in the calculation or determination made during the step 106 for a price of a benefit may include: a cover amount charged or needed by a retailer to cover a price volatility of a product or service, a manufacturer subsidy, a retailer subsidy, a desired margin (may be a dollar amount or percentage), perceived value to the customer, product inventory, an amount of change due to a customer as a result of a transaction, etc.

As previously discussed above, price volatility relates to changes or fluctuations in prices for products or services over time. Customers are often concerned about high price volatility and may be willing to purchase a guarantee that they can purchase a product or service in the future at a price that is less than, equal to, or no more than a fixed amount or percentage higher than the price the customer is paying, or a merchant is currently offering, for the product or service in a current transaction or that a customer may desire to purchase in a future transaction. In some embodiments, a price for a benefit may be calculated or determined before the benefit is sold or offered for sale to a customer and the determination of a price for a benefit during the step 106 may include retrieving a price from a benefits database that may store price and other benefit related information.

One example formula for determining the price of a benefit wherein the benefit provides a price guarantee that the customer will not have to pay a larger amount for a product or service in a future transaction than the customer is paying for the product or service in a current transaction may be that the a customer price for the benefit equals a cover amount charged to cover price volatility, minus a retailer subsidy and minus a manufacturer subsidy, plus a desired margin. In cases where no retailer or manufacturer subsidies exists, a price determined for a benefit during the step 106 may equal a cover amount plus a desired margin.

A cover amount is an amount needed or charged by a retailer to cover and protect the retailer against price volatility of a product or service. A cover amount often is used to protect a retailer against increases in the customer price of the product or service that the retailer would have to cover if a customer purchased a price guarantee for the product or service. For example, a cover amount of ten cents charged for a benefit to cover price volatility of a product or service, or a "shopping list" of products and/or services, would protect a retailer for any increase in price of the product or service, or in the "shopping list" of products and/or services, up to ten cents. A customer paying a price of ten cents for such a benefit therefore believes that a price for a product or service, or a "shopping list" of products and/or services, may increase more than ten cents by a future time at which the customer will be purchasing the product or service. Regardless of any price increase, the customer is receiving a guaranteed or "lock-in" price for the product or service, or the "shopping list" of products and/or services. If the price of the product or service, or the "shopping list" of products and/or services, increases more than ten cents, the controller 202, a retailer, etc. may lose money on that particular product or service, or the "shopping list" of products and/or services, because the retailer did not adequately determine the cover amount needed for the benefit or the accurate price which to charge the customer for the benefit.

A cover amount to cover price volatility of a product or services may be determined or calculated in many different ways, and may take into account several different factors. For example, some factors in calculating the cover amount for a product or service may include: historical price volatility for the product or service, expected price volatility for the product or service, known or expected price increases or decreases for the product or service, known or expected sales volume on products or services, etc.

Various statistical modeling techniques may be used in determining the correct cover amount to charge to cover price volatility for a product or service. A simple technique or method is just to estimate, based, at least in part, on historical volatility, the expected increase in price over the time period for which the price may be guaranteed. For example, assume that price changes for a product over a period of one week for the past three years are most accurately approximated by a uniform distribution between minus one cent and plus three cents (i.e., between one cent less and three cents more than an average price), giving an average change of plus one cent, and a standard deviation of one and one-third cents. The controller 202, a retailer, etc. sets a desired ninety-five percent probability that it does not lose money on the price guarantee, so the controller 202, retailer, etc. determines a price guarantee during the step 106 at 2.8 cents. Determination of a price for a benefit during the step 106 may also use known methods or techniques used to price securities options, such as Black-Scholes options pricing.

While the previous examples have primarily focused in on selections of cover amounts for individual products, risks associated with determining cover amounts for individual products may be spread out over many products, thereby reducing the negative effects to a retailer if the retailer does not determine the proper cover amount of one specific product. For example, suppose the current retail prices for products A, B and C are one dollar, three dollars and two dollars, respectively, and the retailer charges a customer a price of one cent, three cents, and two cents, respectively for a price guarantee to the customer for the three products A, B and C (i.e, the customer is paying one cent for a price guarantee of one dollar for the product A, three cents for a price guarantee of three dollars for the product B, and two cents for a price guarantee of two dollars for the product C). Thus, the customer pays a total of six cents (e.g., one cent plus three cents plus two cents) for a benefit of guaranteed prices of one dollar, three dollars and two dollars in the future for the three products A, B and C, respectively. If in the future the price of the products A and C remain unchanged but the price of the product B increases by five cents, the retailer has still made a profit of one cent since the total prices for the products A, B and C rose five cents but the customer paid six cents for the price guarantee. While the retailer lost money on the product B since the benefit for the price guarantee for the product B was three cents and the price product B rose five cents, the retailer still made a profit on the collection of products A, B and C.

As seen by the previous example, risk spreading among multiple products helps a retailer avoid losing money when selling benefits for application during a later transaction. Such risk spreading may also benefit customers since benefit prices for individual products may be determined less conservatively when the risk of price increases to the retailer is spread over multiple products, thereby enabling the retailer to lower the prices of the benefits to the customer.

The existence or availability of a manufacturer or retailer subsidy may also be used to determine or identify a price for a benefit during the step 106. A manufacturer subsidy may be an amount a manufacturer would be willing to subsidize a benefit of a price guarantee for a product or service based on the chance that the customer would purchase the product or service again due to the pricing benefit purchased or received by the customer. Similarly, a retailer subsidy may be an amount a retailer is willing to subsidize the benefit. The retailer may want to subsidize the benefit as the retailer may expect to gain value from the customer returning to the retailer. The desired margin may be any additional margin, profit, etc. that the controller 202, a retailer or store, etc. would like to receive for selling the benefit determined during the step 104 to a customer. For example, a retailer may determine that, given the price volatility of a product for a given period of time, the cover amount that the retailer would like to charge is ten cents. The retailer believes that by charging ten cents, over the long run, the retailer will not lose money as a result of price changes for the product. Of course, accuracy of a retailer's determined cover amount may vary from retailer to retailer and will depend in large part on how conservative the retailer desires to be in such a determination. For this example, the cover amount charged by a retailer to cover against expected maximum price increases for the product is ten cents, even though the price may increase by more than ten cents. A retailer may be willing to pay three cents of any price increase if a customer agrees to purchase a benefit having a price guarantee that the customer can pay the current price for the product the next time the customer purchases the product at the retailer. The retailer may be willing to pay the three cents just to motivate the customer to make the next purchase at the retailer. In addition to a retailer subsidy, a manufacturer of the product may be willing to pay two cents of any price increase in the product if a customer agrees to purchase a benefit having a price guarantee that the customer can pay the current price for the product the next time the customer purchases the product. The manufacturer may be willing to pay the two cents to help keep the customer brand-loyal to the manufacturer's products or to help prevent the customer from buying products made by other manufacturers. If the controller 202 or the entity operating the method 100 desires to have a margin of at least two cents (i.e., the controller 202 or the entity desires to make a profit of two cents even if the price of the product rises by ten cents), the price of the benefit determined during the step 106 preferably should be a minimum of seven cents (i.e., $0.07=$0.10−$0.03−$0.02+$0.02) based on the formula that price for the benefit equals a cover amount charged to cover expected price volatility, minus a retailer subsidy, minus a manufacturer subsidy, and plus a desired margin.

The determination of a cover amount may be made in many different ways. If an entity using the method 100 desires to take a conservative approach to determining a cover amount for a product, the entity may have the cover amount be an amount that would cover most or all price increases given a price volatility for a product. For example, if the probability, given a distribution of price changes, that a price increase will be less than twenty cents is ninety-five percent, the entity may set the cover amount to be twenty cents. If the entity desires to be less conservative on a specific transaction, the entity may have the cover amount be less than twenty cents. Thus, the determination or setting of the cover amount allows the entity to manage risk according to the entity's desires or comfort level. In addition, there are many ways to determine cover amount and the entity may choose a less or more conservative approach to determining cover amount as desired. As previously discussed above, the cover amount can be used to determine the price for a benefit during the step 106.

In some situations, a price determined during the step 106 for a benefit may be too high or exceed a predefined threshold such that the benefit determined during the step 104 is not offered for sale to a customer during a current transaction. For example, if the price determined during the step 106 for the benefit determined during the step 104 exceeds a predetermined threshold, a predetermined number, or a predetermined percentage of the price to a customer of the product(s) and/or service(s) being purchased by the customer during the current transaction, no benefit may be offered for sale to a customer. Alternatively, the controller 202 or retailer device may return to the step 104 and determine a different benefit to offer the customer during the current transaction.

In some situations, a price determined during the step 106 for a benefit may be zero such that the benefit can be given or provided to a customer during a current transaction at zero price or no charge to the customer. The customer can then apply or use the benefit during a future transaction.

Once a price has been determined during the step 106 for the benefit determined during the step 104, an indication of the price and/or the benefit may be provided or offered to a customer, a customer device, a retailer, a retailer device, etc., by a cashier, the controller 202, a retailer device, a retailer, etc. In addition, the benefit may be offered for sale, sold or otherwise provided to a customer as part of a current transaction. Alternatively, the benefit might not be offered for sale or provided to the customer until a period of time after the current transaction is completed. If desired, a customer may be required to go to a specific retailer, log onto a specific World Wide Web page, call a specific telephone number, download specific information, etc. in order to receive or purchase the benefit, or receive information about the benefit and its associated price.

In an online implementation of the method 100, the price determined during the step 106 for the benefit determined during the step 104 may be communicated to a customer via an email message or other electronic transmission from the controller 202 to a customer device or retailer device. In a retail or in-store implementation of the method 100, the price determined during the step 106 for the benefit determined during the step 104 may be communicated to a customer visually or audibly by a retailer device, a customer device, or a cashier, check-out clerk, or store employee at the retailer device. The customer may then purchase the benefit, agree to purchase the benefit, or arrange to purchase the benefit.

In some embodiments, an indication of an acceptance or agreement to purchase a benefit may be received from the customer of the determined benefit at the determined price and the method 100 may include selling or otherwise providing the benefit to the customer at the price determined during the step 106. If the customer does not accept or purchase the benefit, the benefit may be offered to the customer at a lower or different price. If desired, the method 100 may include a step where a determination is made as to whether or not to offer, sell or otherwise provide a benefit to a customer. For example, a benefit determined during the step 104 may not be offered or provided to a customer if the price determined during the step 106 for the benefit is more than ten cents, exceeds a percentage of, or threshold related to, a total price for the products and/or services that the customer is purchasing in the current transaction, etc.

Additionally, in some embodiments, once a benefit determined during the step 104 has been sold or provided to a customer by a cashier, through a screen on a retailer device, etc., there may be a need for some measure, means or ability to track, apply, and/or redeem the benefit by the customer or other designated entity during the step 108. In one embodiment, the controller 202 or a retailer device may maintain a benefits database that tracks the benefits that have been sold, and then based on a customer identifier, applies the benefits given to the customer during future transactions conducted by the customer. Information regarding customers and customer identifiers could be kept in a customer database and accessed by the controller 202 or a retailer device as needed. Many different types of data could be used as a customer identifier including: a shopping club card number, a cellular telephone number or identifier, a credit card number, a customer name, a social security number, a customer email address, biometrics data (e.g., fingerprint, voice print), a customer PIN (personal identification number), etc.

Redemption or application of a benefit during the step 108 may be implemented or occur in many ways including, but not limited to, printing a benefit code on a receipt for a current transaction conducted or completed by a customer that the customer must bring or provide to a retailer to redeem or receive the benefit, requiring the customer to bring a receipt from the previous transaction that shows that the customer purchased a previously determined benefit, or printing out a coupon or voucher that illustrates or indicates a benefit, such as a guarantee of a price for a single product or multiple products. In this embodiment, a benefit identifier is used to identify the benefit to provide to the customer or to apply during the customer's transaction. Benefit identifiers and other benefit related information could be maintained in a benefits database and accessed or updated by the controller 202, a retailer device, etc. during a customer transaction or as needed during the method 100.

During a future trip to a retailer, a customer who previously purchased a benefit could identify himself or herself to redeem or otherwise use the benefit (e.g., by presenting or swiping a credit card or shopping club card having a unique identifier, sending a signal from a personal digital assistant, typing in his or her email address, telling a cashier his or her email address or social security number, etc.). Alternatively, a customer could present a benefit identifier to a cashier or retailer device that identifies a benefit (e.g., giving the cashier a receipt from a previous transaction with a code printed on it, presenting the cashier with a previously printed coupon or voucher that identifies the benefit, etc.). In some embodiments, some or all of a price paid by a customer to receive or purchase a benefit might be refunded to the customer during a future transaction or as a result of a future transaction. For example, if a customer pays ten cents to purchase a price guarantee for a product to be purchased during a later transaction at a retailer, and the retail price of the product at the later transaction decreases, the retailer may refund some or all of the ten cents that the customer paid for the benefit.

As previously discussed above, the method 100 can be used to sell a customer a benefit during a first transaction at a retailer wherein the benefit allows a customer to purchase one or more products and/or services during a second transaction at a guaranteed or "locked-in" price. The one or more of the products and/or services purchased by the customer during the first transaction may be purchased by the customer during the first second transaction also. During the step 102 the controller 202 or a retailer device, such as the retailer device 204, receives transaction information regarding the products and/or services being purchased by the customer during a first transaction. The transaction information may also include price information for the products and/or services being purchased by the customer during the first transaction.

During the steps 104 and 106, the controller 202 or the retailer device 204 determines what benefit to offer for sale to the customer and at what price the benefit will be offered for sale to the customer. In a price "lock-in" or price guarantee embodiment, the benefit presumably will allow the customer to purchase, during a later second transaction, one or more specific products and/or services at a designated price, such as the price currently offered by the retailer for the specific products and/or services. The controller 202 or the retailer device 204 will offer the benefit for sale to the customer during the first transaction or otherwise indicate the availability of the benefit for purchase by the customer during the first transaction. The customer will then provide an indication of an acceptance of the offer to purchase the benefit or an indication of an agreement or willingness to purchase the benefit.

When the customer purchases the benefit, the controller 202 or retailer device 204 may provide the customer with a benefit identifier during or after the first transaction for the customer to use during the second transaction. In addition, the controller 202 or the retailer device 204 may update a benefits database to record information regarding the benefit identifier, the benefit associated with the benefit identifier, a customer identifier, an expiration date for the benefit, etc.

During the second transaction where the customer is purchasing one or more products and/or services, the customer may provide the benefit identifier to the controller 202 or the retailer device 204, which can then look up and determine the benefit in the benefits database and the usability of the benefit during the second transaction. The controller 202 or the retailer device can then apply the benefit on the customer's behalf during the second transaction. Thus, the customer is able to obtain the guaranteed price provided by the benefit for one or more of the products and/or services purchased by the customer during the second transaction.

Figure 3:
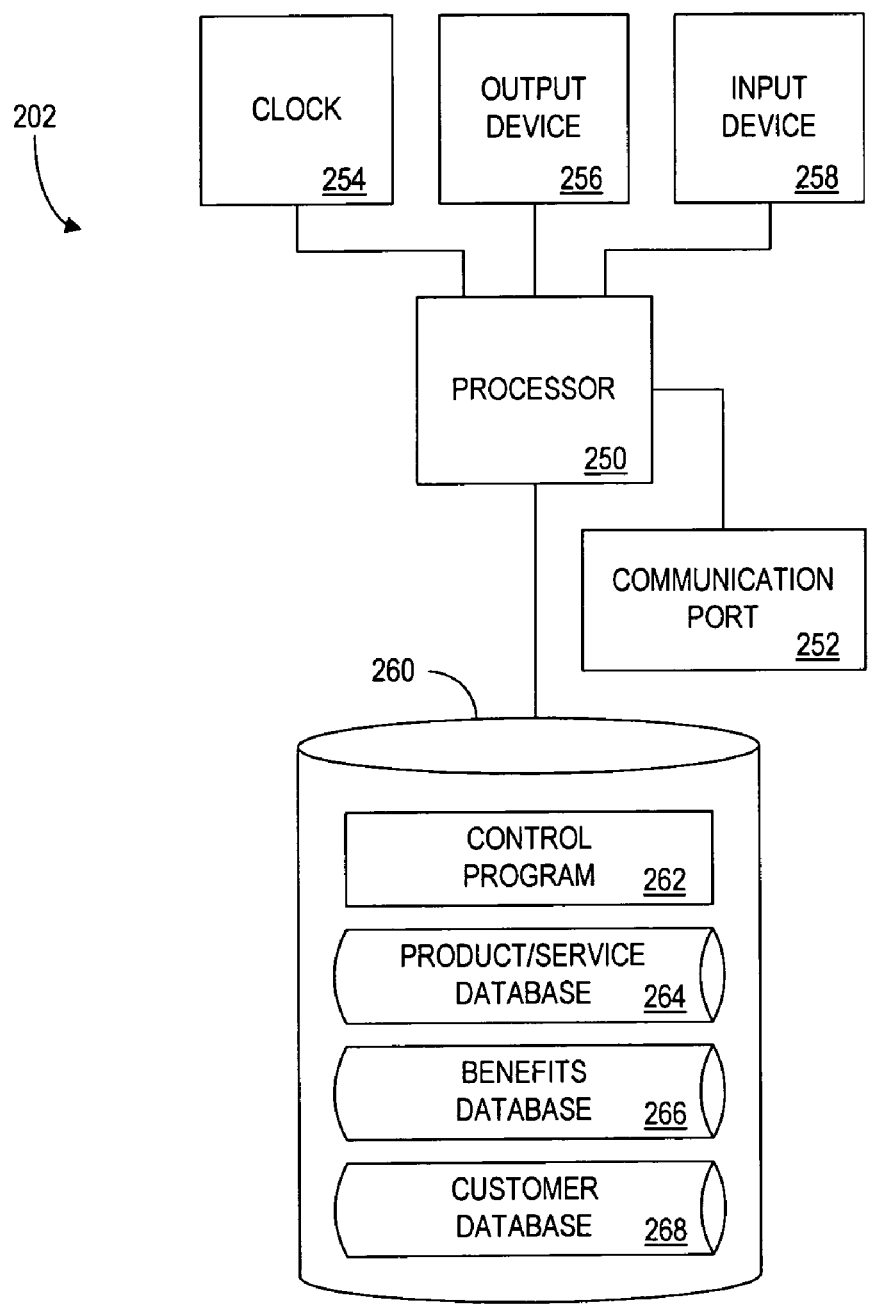
FIG. 3 is a block diagram illustrating a representative controller of FIG. 2.

Now referring to FIG. 3, a representative block diagram of a controller, such as the controller 202, is illustrated. The controller 202 may include a processor, microchip, or computer 250 that is in communication with or otherwise uses or includes one or more communication ports 252 for communicating with customer devices, retailer devices, and/or other devices. For example, if the controller 202 is connected to the retailer device 204 via an Ethernet local area network and the customer device 204 via a cellular telephone network, the controller 202 may have an Ethernet adapter as one communication port to allow the controller 202 to communicate with the retailer device 204 and a connection to a cellular telephone network as another communication port to allow the controller 202 to communicate with the customer device 204.

The controller 202 may also include an internal clock element 254 to maintain an accurate time and date for use by the controller 202, create time stamps for information, messages, indications, etc. generated via the controller 202 or received by the controller 202, etc.

If desired, the controller 202 may include one or more output devices 256 such as a printer, infrared or other transmitter, antenna, audio speaker, display screen or monitor, text to speech converter, etc., as well as one or more input devices 258 such as a bar code reader or other optical scanner, infrared or other receiver, antenna, magnetic stripe reader, image scanner, roller ball, touch pad, joystick, touch screen, microphone, computer keyboard, computer mouse, etc. In addition, the controller 202 may include a voice recognition system or interactive voice response unit as an input device 258 to aid in or enable receiving and processing of information, messages, indications, etc. The controller 202 may also include a fingerprint scanner or reader, a retinal scanner, a voice analyzer, or other biometrics data input device as an input device 258 to allow the controller 202 to identify customers if customers directly interact with the controller 202. Including an input device 258 in the controller 202 allows the controller 202 to receive customer, product, benefit, price or other information, messages, indications, etc. directly from a customer while including an output device in the controller 202 allows the controller 202 to provide information, messages, indications, etc. directly to a customer. If desired, the controller 202 may also function as a customer device and/or as a retailer device.

In addition to the above, the controller 202 may include a memory or data storage device 260 to store information, software, databases, device drivers, customer information, product information, service information, benefit information, etc. The memory or data storage device 260 preferably comprises an appropriate combination of magnetic, optical and/or semiconductor memory, and may include, for example, Random Access Memory (RAM), Read-Only Memory (ROM), a tape drive, flash memory, a floppy disk drive, a ZIP™ disk drive, a compact disc and/or a hard disk. The processor 250 and the data storage device 260 in the controller 202 may each be, for example: (i) located entirely within a single computer or other computing device; or (ii) connected to each other by a remote communication medium, such as a serial port cable, telephone line or radio frequency transceiver. In one embodiment, the controller 202 may comprise one or more computers that are connected to a remote server computer for maintaining databases.

A conventional personal computer or workstation with sufficient memory and processing capability may be used as the controller 202. In one embodiment, the controller 202 operates as or includes a web server for an Internet environment. The controller 202 preferably transmits and receives data related to transactions, benefits, customers, benefit prices, products, services, etc. and is capable of high volume transaction processing, performing a significant number of mathematical calculations in processing communications and database searches. A Pentiumm microprocessor such as the Pentium III™ microprocessor, manufactured by Intel Corporation may be used for the processor 250. Equivalent processors are available from Motorola, Inc., AMD, or Sun Microsystems, Inc. The processor 250 may also comprise one or more microprocessors, central processing units, computers, computer systems, etc.

While specific implementations and hardware configurations for the controller 202, the retailer device 204, and the customer device 206 have been described, it should be noted that other implementations and hardware configurations are possible and that no specific implementation or hardware configuration is needed. Therefore, many different types of implementations or hardware configurations can be used in the system 200 and with the method 100 and the methods disclosed herein are not limited to any specific hardware configuration for the system 200.

Software may be resident and operating or operational on the controller 202. The software may be stored on the data storage device 260 and may include some or all of the following: a control program 262 for operating the controller 202; a product/service database 264 for storing information about products and/or services; a benefits database 266 for storing information about benefits; and a customer database 268 for storing information regarding one or more users or customers. In some embodiments, the controller 202 may include a transaction database for storing information regarding to sales of products or services and/or other transactions.

Each of the databases 264, 266 and 268 and their use and potential data structure will be discussed in more detail below. As will be understood by those skilled in the art, the schematic illustrations and accompanying descriptions of the databases presented herein are exemplary arrangements for stored representations of information. A number of other arrangements may be employed besides those suggested by the tables shown. Similarly, the illustrated entries of the databases represent exemplary information only. Thus, those skilled in the art will understand that the number and content of the entries can be different from those illustrated herein. Not all of the databases 264, 266 and 268 will be used or needed in every embodiment of the method 100 or the system 200. Furthermore, some embodiments of the method 100 or the system 200 may use none or only some of the databases 264, 266 and 268. Of course, there may be embodiments of the method 100 or the system 200 where all of the databases 264, 266 and 268 are used.

The control program 262 may control the processor 250. The processor 250 preferably performs instructions of the control program 262, and thereby operates in accordance with the present invention, and particularly in accordance with the methods described in detail herein. The control program 262 may be stored in a compressed, uncompiled and/or encrypted format. The control program 262 furthermore includes program elements that may be necessary, such as an operating system, a database management system and device drivers for allowing the processor 250 to interface with peripheral devices, databases, etc. Appropriate program elements are known to those skilled in the art, and need not be described in detail herein. According to an embodiment of the present invention, the instructions of the control program 262 may be read into a main memory from another computer-readable medium, such as from a ROM to RAM. Execution of sequences of the instructions in the control program 262 causes the processor 250 to perform the process steps described herein. In alternative embodiments, hard-wired circuitry may be used in place of, or in combination with, software instructions for implementation of some or all of the methods of the present invention. Thus, embodiments of the present invention are not limited to any specific combination of hardware and software.

As previously discussed above, the product/service database 264 can be used to store information and data regarding one or more products and/or services, any subsidies associated with the products or services, a retailer's desired margin, and preferred prices to be charged for the products and services to protect retailers, the controller, etc. against price increases. The product/service database 264 may be populated, used, accessed, and/or updated by the controller 202, a retailer device, or a customer device prior to or during the steps 102, 104, 106 and/or 108.

A tabular representation of a possible implementation of, or data structure for, the product/service database 264 is illustrated in FIG. 4. The product/service database 264 illustrated in FIG. 4 is representative of an embodiment wherein a benefit provided to a customer, or to some other person designated by the customer, is in the form of a guaranteed price that the customer can pay for one or more products or services during a future transaction. Thus, the customer who purchases a benefit does not need to be concerned with price variations and increases in the price for the products and services as the customer is guaranteed to not have to pay more than a maximum price for the products or services.

The product/service database 264 illustrated in FIG. 4 may include a product/service identifier field 300 which may include identifiers or other identifying information for one or more products and/or services, a product/service description field 302 which may include descriptive and other information for the products and/or services identified in the field 300, a cover amount field 304 which may include cover amounts needed for a benefit of guaranteed prices of the products or services identified in the field 300, a retailer subsidy field 306 which may include information regarding how much a retailer will pay to subsidize a benefit provided to a customer, or to some other person designated by the customer, controller 202, retailer, etc. for a purchase of the products or services identified in the field 300, a manufacturer subsidy field 308 which may include information regarding how much a manufacturer will pay to subsidize a benefit provided to a customer or other person for the customer's or other person's purchase of the products or services identified in the field 300, and a margin field 310 which may include information regarding how much a retailer, the controller 202, or another entity would like to receive for selling a benefit to customers for the products or services identified in the field 300. The total price determined during the step 106 for the benefit can be determined from the information in the fields 304, 306, 308, and 310 according to the formula discussed above where benefit price equals cover amount minus a manufacturer subsidy minus a retailer subsidy plus a desired margin.

For example, the product identified in the record 314 as "P-C6503" in the product/service identifier field 300 is a can of Campbells™ Tomato Soup, as indicated in the description field 302. As previously discussed above, a price for a benefit may be determined during the step 106 as the cover amount needed or charged to handle price volatility for a product or service (i.e., the cover amount price provided in the field 304) minus an available retailer subsidy (i.e., the retailer subsidy provided in the field 306) minus an available manufacturer subsidy (i.e., the manufacturer subsidy provided in the field 308) plus the margin (i.e., the margin amount provided in the field 310). Thus, for the product identified in the record 314 as "P-C6503" in the product/service identifier field 300, a price determined during the step 106 for a benefit guaranteeing the current price of the product "P-C6503" during a future purchase of the product "P-C6503" might be $0.01 (i.e., $0.03−$0.0−$0.05+$0.03), as indicated by the fields 304, 306, 308, 310. For the product identified in the record 312 as "P-P2453" in the product/ service identifier field 300, a price determined during the step 106 for a benefit guaranteeing the current price of the product "P-P2453" during a future purchase of the product "P-C2453" might be $0.01 (i.e., $0.08-$0.10-$0.0+$0.03), as indicated by the fields 304, 306, 308, 310. For the product identified as "P-G7589" in the product/service identifier field 300, a price determined during the step 106 for a benefit guaranteeing the current price of the product "P-G7589" during a future purchase of the product "P-G7589" might be $0.07 (i.e., $0.04-$0.0-$0.1+$0.04), as indicated by the fields 304, 306, 308, 310. For the service identified in the record 324 as "S-K0706" in the product/service identifier field 300, a price determined during the step 106 for a benefit guaranteeing the current price of the product "S-K0706" during a future purchase of the product "S-K0706" might be $1.50 (i.e., $1.00-$0.50+$1.00), as indicated by the fields 304, 306, 308, 310.

Information in the product/service database 264 may be added or updated by the controller 202 or a retailer device periodically or as needed. For example, as desired or needed cover amounts or margin amounts change, the entries for the fields 304 and 310 may be updated by the controller 202 or a retailer device. Likewise, the entries for the fields 306 and 308 may change or be updated by the controller 202 or a retailer device as the amount and number of retailer subsidies and manufacturer subsidies changes. Similarly, products and services may be added and deleted from the product/service database 264 by the controller 202 or a retailer device as their availability, inventory, etc. changes.

While the product/service database 264 illustrated in FIG. 4 provides information for five records 312, 314, 316, 318 and 320 identified by the product identifiers "P-P2453," "P-C6503," "P-D8562," "P-G7589" and "P-S6242," respectively, in the product/service identifier field 300 and two services 322 and 324 identified by the service identifiers "S-J9168" and "S-K0706," respectively in the product/service identifier field 300, there is no limit to the number of products and/or services for which information can be stored in the product/service database 264 and different fields may be used in the product/service database 264.

As previously discussed above, the benefits database 266 can be used to store information and data regarding benefits that have been purchased by or for customers, as well as prices for products and/or services that are associated with the benefits. The benefits database 266 may be populated, used, accessed, and/or updated by the controller 202, retailer device, a customer device, etc. prior to or during any of the steps 102, 104, 106, and/or 108. For example, a retailer device may provide the controller 202 with benefit information when a customer purchases a benefit via the retailer device.

A tabular representation of a possible implementation of, or data structure for, the benefits database 266 is illustrated in FIG. 5. The benefits database 266 illustrated in FIG. 5 is representative of an embodiment wherein a benefit provided to a customer is in the form of a guaranteed price that the customer can pay for one or more products or services during a future transaction. Thus, the customer does not need to be concerned with price variations and increases in the price for the products and services as the customer is guaranteed to not have to pay more than a maximum price for the products or services. Should the customer not complete the future transaction within a designated time or expiration period, the benefit may expire, be canceled, or otherwise terminate.

The benefits database 266 illustrated in FIG. 5 may include a customer identifier field 350 which may include identifiers or other identifying information for one or more customers or users, product/service identifier fields 352, 354 which may include identifiers or other identifying information for one or more products and/or services being purchased or going to be purchased by the customers identified in the field 350 during or as part of a future transaction, price fields 356, 358 which may include prices for the products or services identified in the fields 352, 354, respectively, to be paid by the customers identified in the field 350 during or as part of a future transaction, quantity fields 360, 362 which may contain quantity information for the products or services identified in the fields 352, 354, respectively, to be purchased by the customers identified in the field 350 during or as part of a future transaction (e.g., the customer may be limited to purchasing a designated number of products at a guaranteed price during a later transaction); and a benefit expiration field 364 which may contain information as to when the prices indicated in the fields 356, 358 for the products or services indicated in the fields 352, 354, respectively, for the customers identified in the field 350 will no longer be available or guaranteed. In some embodiments, the benefits database 266 may also include a status field that may include information regarding whether a customer has redeemed or applied a benefit, whether a benefit is unexpired or expired, etc.

For example, the customer identified as "C-253640" in the customer identifier field 350 has received a benefit in the form of price guarantees for two products "P-G7589" and "P-D8562" as indicated in the fields 352, 358, respectively. The product "P-G7589" is a thirty-two ounce jar of Ragu™ pasta sauce and the product "P-D8562" is tube of Crest™ toothpaste, as indicated in the product/service description field 302 in the product/service database 264 illustrated in FIG. 4. The customer is guaranteed to pay no more than $2.79 for one of the products "P-G7589," as indicated by the fields 356 and 360 and to pay no more than $2.89 for one of the products "P-D8562," as indicated by the fields 358 and 362, so long as the customer "C-253640" completes the purchases by Aug. 22, 2000, as indicated in the field 364.

While the benefits database 266 illustrated in FIG. 5 provides information for five customer records 366, 368, 370, 372 and 374 identified by the customer identifiers "C-253640," "C-734507," "C-834663" and "C-783467," respectively, in the customer identifier field 350, there is no limit to the number of customers and/or benefits for which information can be stored in the benefits database 266 and different fields may be used in the benefits database 266. Note that the customer identified as "C-783467" has been involved in two separate transactions, as indicated by the customer identifiers for the customer records 372, 374. There is no limit as to the type of benefits that may be provided for or on the behalf of customers for which information can be stored in the benefits database 266.

In some embodiments of the benefits database 266, benefit identifiers may be used in place of, or along with, customer identifiers. Thus a benefit identifier field may be used in place of, or along with, the customer identifier field 350. Such embodiments allow a customer to apply a benefit without having to produce or have a customer identifier. For example, a customer who purchases a benefit from a retailer device during a first transaction may receive a benefit identifier from the retailer device. The retailer device can update the benefits database 266 to include the benefit identifier and other information related to the benefit sold to the customer. The customer can provide the benefit identifier back to the retailer device, or another retailer device at the retailer, when the customer desires to apply the benefit during a later second transaction. The retailer or retailer device can access the benefits database 266 to determine what benefit to apply to the second transaction or to provide the customer during the second transaction. All of the previous procedure can be accomplished without knowing the identify of the customer or without storing a customer identifier of the customer in the benefits database 266.

As previously discussed above, the customer database 268 may be used to store information and data regarding customers or users initiating, participating, or completing transactions and/or receiving benefits. The customer database 268 may be used, accessed, and/or updated by the controller 202, a retailer device, a customer device, or some other device during the steps 102, 104, 106 and/or 108. A tabular representation of a possible implementation of, or data structure for, the customer database 268 is illustrated in FIG. 6.

The customer database 268 may include a customer identifier field 400 which may contain identifiers or other identifying information for users, customers, etc., a customer name field 402 which may contain name or other information for the customers identified in the field 400, a contact information field 404 which may contain contact information, such as email addresses, postal addresses, telephone numbers, facsimile numbers, etc., for the customers identified in the field 400, and a payment identifier field 406 which may contain information regarding a credit card account, financial account, or other payment identifier information for the customers identified in the field 400. In some embodiments, the customer database 268 may also include product or service preference information for the customers identified in the field 400 or other personal information about customers identified in the field 400.

While the customer database 268 illustrated in FIG. 6 provides information for three customer records 412, 414 and 416 identified by the customer identifiers "C-123654," "C-876567" and "C-431789," respectively, in the customer identifier field 400, there is no limit to the number of customers for which information can be stored in the customer database 268 and different fields may be used in the customer database 268.

Figure 7:
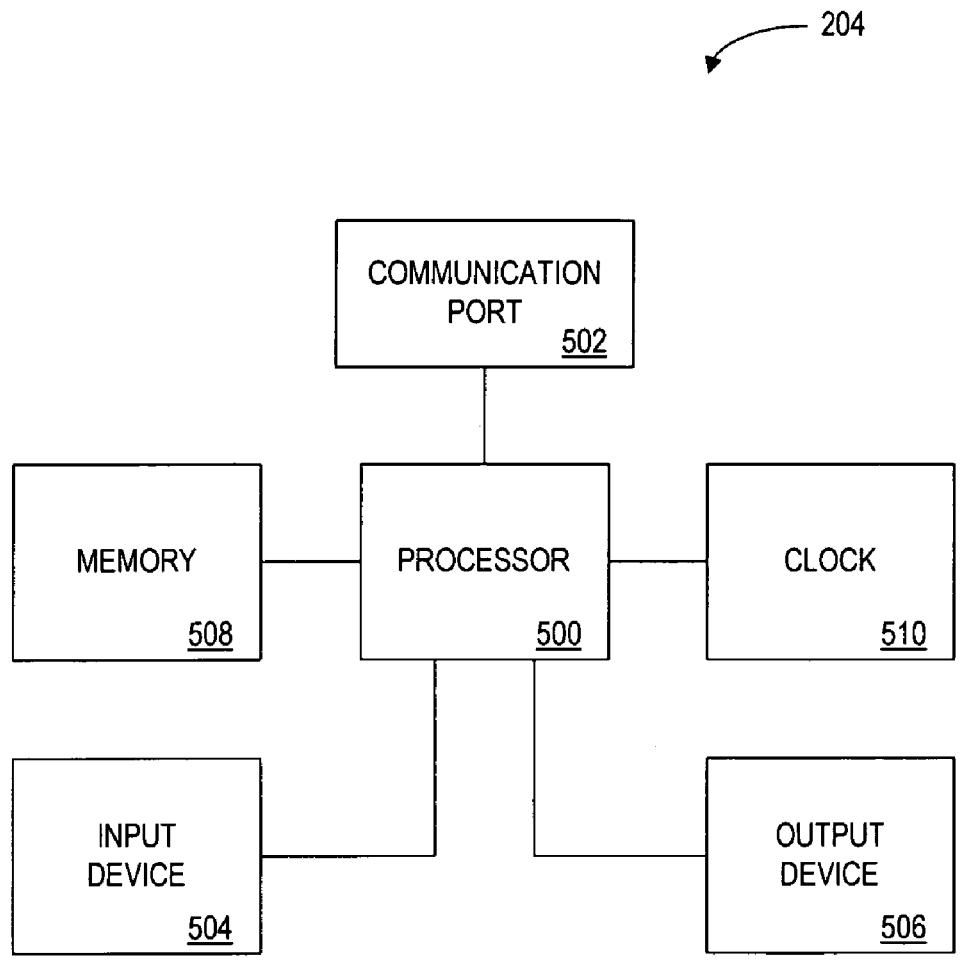
FIG. 7 is a block diagram illustrating a representative retailer device of FIG. 2.

Now referring to FIG. 7, a block diagram of a basic retailer device, such as the retailer device 204. The retailer device 204 may include a processor, central control unit or controller 500 that uses or includes one or more communications ports 502 for connecting to or communicating with the controller 202, a customer device, the communications network 210 or to any other devices. The retailer device 204 may be, include, or control one or more point-of-sale terminals, cash registers, etc.

The retailer device 204 may also include one or more input devices 504, such as a bar code reader, image scanner, microphone, roller ball, touch pad, joy stick, computer keyboard, or computer mouse to allow a cashier, check-out clerk, retailer employee, a customer, etc. to enter information into the retailer device 204. In addition, the retailer device 204 may include one or more output devices 506, such as a printer, a display screen or monitor, a text to speech converter, etc. to allow a cashier, check-out clerk, retailer employee, a customer, etc. to receive information from the retailer device 204.

Note that not all of the components of the retailer device 204 will need to be located in a single location. For example, a retailer device might include a single processor 500 that is controlling, connected to or in communication with multiple input devices, output devices, communication ports, etc., some or all of which may be operating remotely from the processor 500. As another example, a single processor 500 or retailer device may control and/or monitor the operation and use of one or more other processors or retailer devices in a master/slave or networked implementation, some or all of which may be considered to be a single retailer device for purposes of the present invention. The retailer device 204 may include a merchant server to which multiple point-of-sale terminals are connected.

Software may be resident and operating or operational on the retailer device 204. The software may be stored or resident on a data or mass storage device or mother memory 508 and may include a control program, information, software, databases, device drivers, etc. The memory or data storage device 508 preferably comprises an appropriate combination of magnetic, optical and/or semiconductor memory, and may include, for example, Random Access Memory (RAM), Read-Only Memory (ROM), a tape drive, flash memory, a floppy disk drive, a ZIP™ disk drive, a compact disc and/or a hard disk.

The retailer device 204 may also include an internal clock element 510 to maintain an accurate time and date for the retailer device 204, create time stamps for messages, indications, transactions, etc. generated, received, conducted, etc. at the retailer device 204, create time stamps for other communications received or generated via the retailer device 204, etc. If desired, the retailer device 204 may also function as, or perform some of the functions of, the controller 202 or a customer device.

A customer device, such as the customer device 206, may have the same structure as the retailer device 204 illustrated in FIG. 7. As previously discussed above, possible customer devices include a personal computer, network terminal or server, telephone, beeper, kiosk, dumb terminal, personal digital assistant, facsimile machine, etc. If desired, the customer device 206 may also function as, or perform some of the functions of, the controller 202 or a retailer device.

Figure 8:
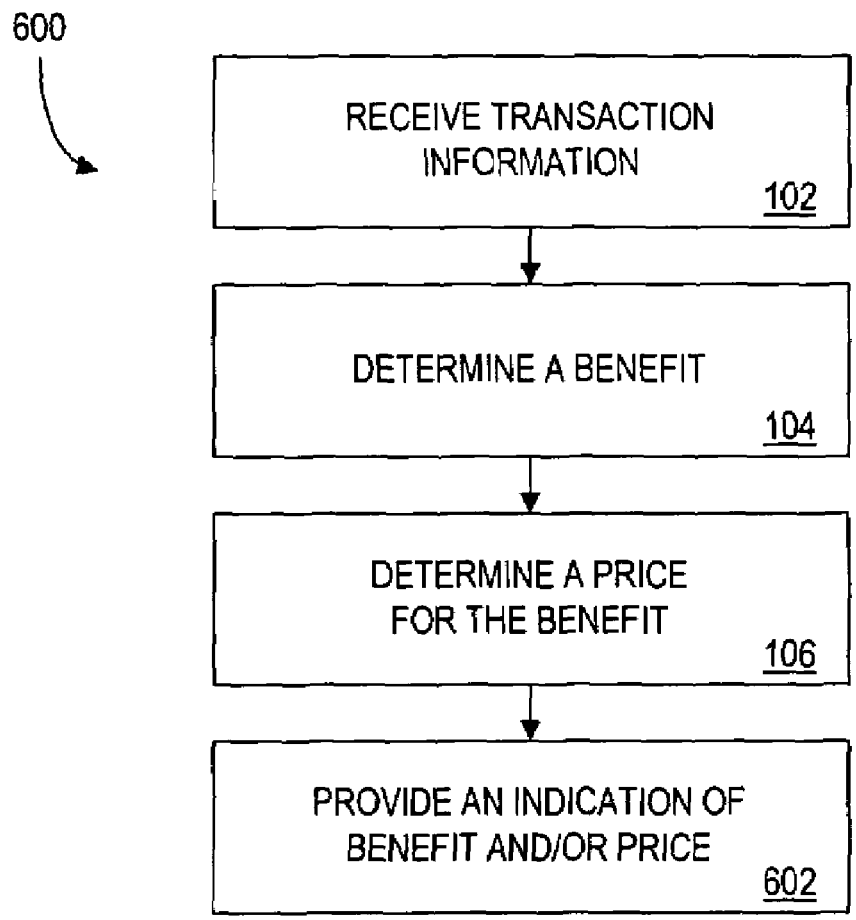
FIG. 8 is a flowchart of a second embodiment of a method in accordance with the present invention and usable with the apparatus of FIG. 2.

Now referring to FIG. 8, a second embodiment 600 of a method in accordance with the present invention is illustrated. The method 600 includes the steps 102, 104, 106, 108 previously discussed above. In addition, the method 600 includes a step 602 during which an indication of the benefit determined during the step 104 and/or an indication of the price for the benefit determined during the step 106 are provided directly or indirectly by or from the controller 202, a retailer device, a customer device, a customer, etc. to the controller 202, a retailer device, a customer device, a customer, a retailer, etc. or to a person, entity or device designated or identified from the controller 202, a customer device, a customer, a retailer, a retailer device, etc. Both the price and the benefit information may be sent in one indication or they may be sent in separate indications. In some embodiments, an indication of the benefit determined during the step 104 will be provided during the step 104 or otherwise prior to the step 106. In addition, in some embodiments, an indication of the price determined during the step 104 will be provided during the step 104. The indication(s) sent during the step 602 may be sent via a different communications method, channel, route, or device than the communications method, channel, route, or device used to receive or detect the transaction information received during the step 102.

Note that in some embodiments, the indication provided during the step 602 may be that no benefit can be provided or offered for sale to a customer. For example, if the price determined during the step 106 exceeds a predetermined threshold, a predetermined number, or a predetermined percentage of the price to a customer of the product(s) and/or service(s) being purchased by the customer during a current transaction, no benefit may be offered for sale to a customer. Thus, the indication provided during the step 602 may be that no benefit is available for sale. Alternatively, the step 602 may be completed simply by not offering any benefit for sale to the customer.

Figure 9:
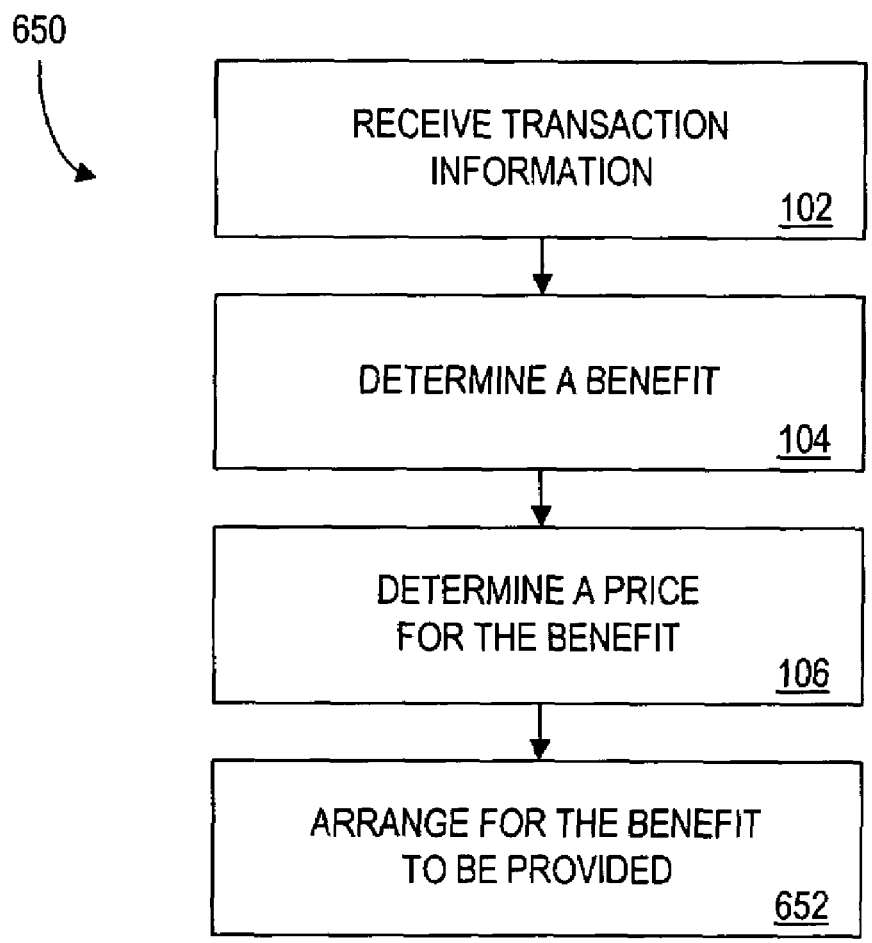
FIG. 9 is a flowchart of a third embodiment of a method in accordance with the present invention and usable with the apparatus of FIG. 2.

Now referring to FIG. 9, a third embodiment 650 of a method in accordance with the present invention is illustrated. The method 650 includes the steps 102, 104, 106 previously discussed above. In addition, the method 650 includes a step 652 during which the controller 202, a retailer device, a customer device, a customer, or some other person, entity or device arranges for the benefit determined during the step 104 to be provided or applied by or to the controller 202, a retailer device, a customer device, a customer, a group of people which may or may not include the customer, a retailer, a retailer device, etc. or to a person, entity or device designated or identified from the controller 202, a retailer device, a customer device, a customer, a retailer, etc. In some embodiments, the method 650 may also include the step 602 previously described above. The benefit may be provided during one or more future transactions and may have conditions or qualifying actions associated with it.

As previously discussed above, a qualifying action may include an agreement by the customer or a requirement for the customer to: purchase a specific product or service at a specific retailer, purchase a specific product or service by a specific date, conduct a future transaction or even a very specific future transaction, purchase a specific product or service during a future transaction, accept a specific magazine subscription, use a specific credit card during one or more future transactions, conduct a future transaction at a designated retailer, stay at a specific hotel or fly with a specific airline the next time the customer travels, etc. The customer may have to complete the qualifying action in order for the customer to redeem the benefit or otherwise have the benefit applied during a future transaction initiated, participated in, or otherwise conducted by the customer.

Figure 10:
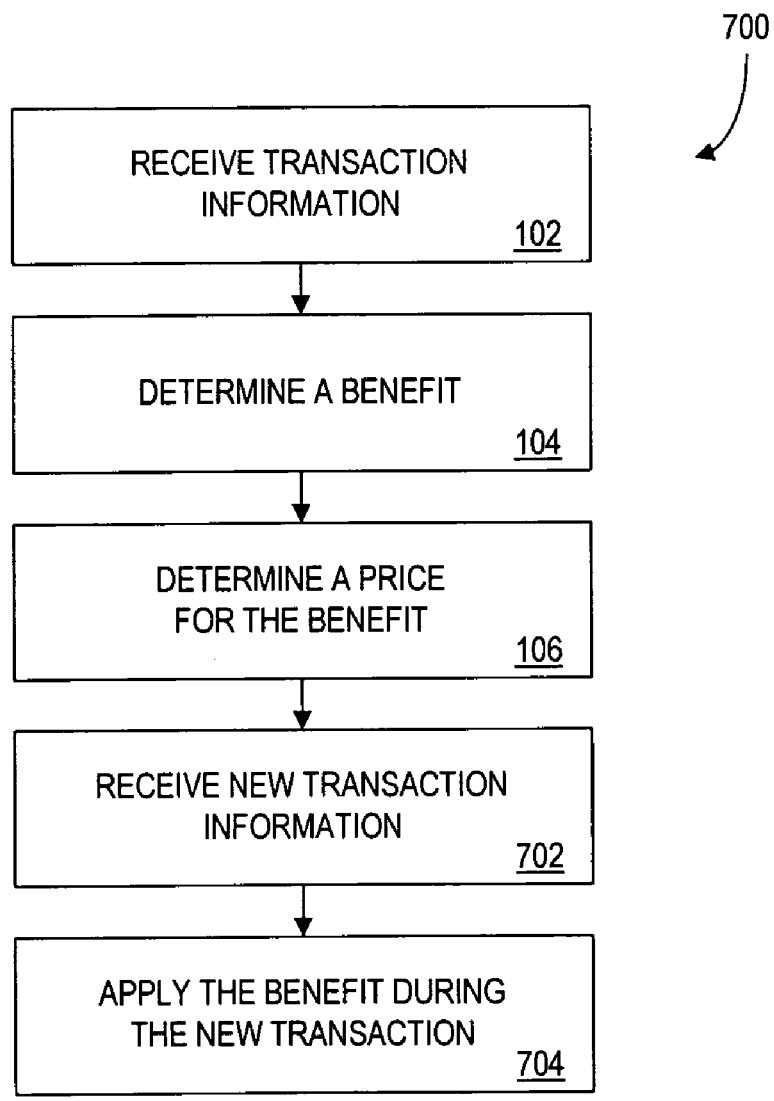
FIG. 10 is a flowchart of a fourth embodiment of a method in accordance with the present invention and usable with the apparatus of FIG. 2.

Now referring to FIG. 10, a fourth embodiment 700 of a method in accordance with the present invention is illustrated. The method 700 includes the steps 102, 104, 106 previously discussed above. In addition, the method 700 includes a step 702 during which the controller 202, a retailer device, a customer device, a customer, or some other person, entity or device receives information for a new transaction for the purchase, rental, lease, etc. of one or more products or services. The information received during the step 702 may be received from a retailer, a point-of-sale terminal or other retailer device, a controller, a customer device, a customer, etc. The step 702 may operate or be performed or completed in a manner similar to the step 102. The information received during the step 702 may be received via a different communications method, channel or device than the information received during the step 102. The method 700 also includes a step 704 during which the benefit determined during the step 104 is applied by the controller 202, a retailer device, a customer, a retailer, a customer device, etc. to the new transaction. In some embodiments, the method 700 may also include the step 602 and/or the step 652 previously described above.

Figure 11:
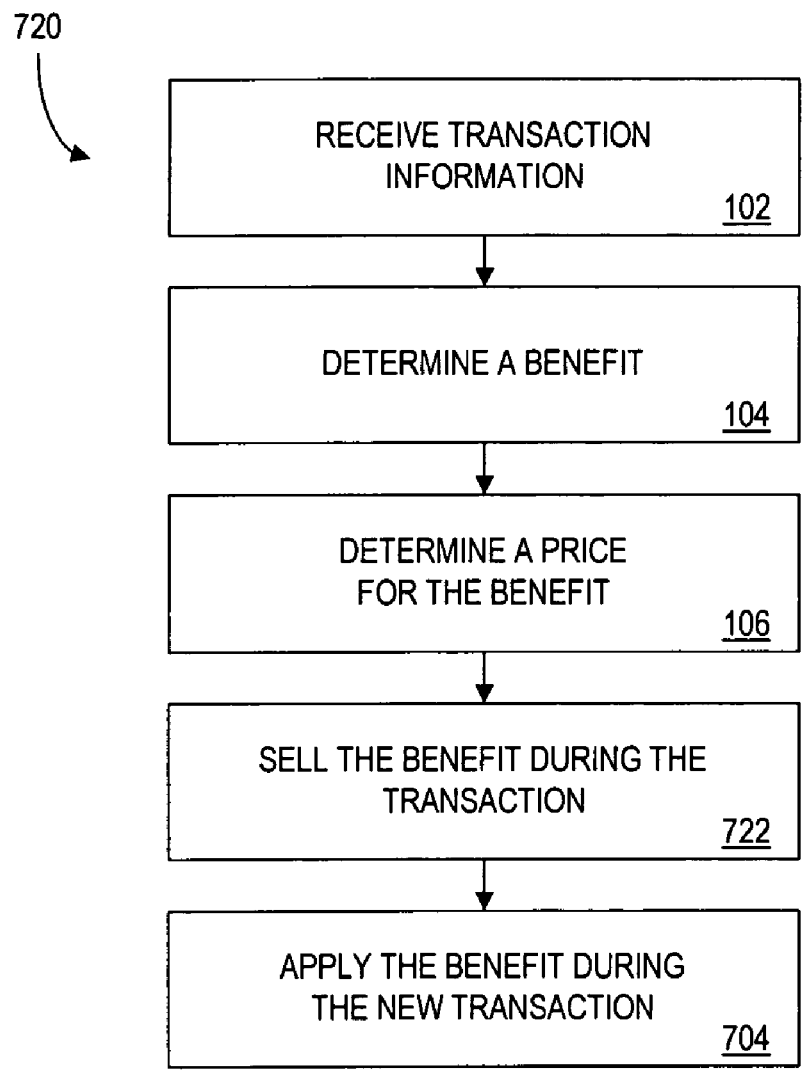
FIG. 11 is a flowchart of a fifth embodiment of a method in accordance with the present invention and usable with the apparatus of FIG. 2.

Now referring to FIG. 11, a fifth embodiment 720 of a method in accordance with the present invention is illustrated. The method 720 includes the steps 102, 104, 106, 704 previously discussed above. In addition, the method 720 includes a step 722 during which the controller 202, a retailer device, etc. sells the benefit determined during the step 104 for the price determined during the step 106 to a customer. In some embodiments, the method 720 may also include one or more of the steps 602, 652, 702 and/or 108 previously described above.

Figure 12:
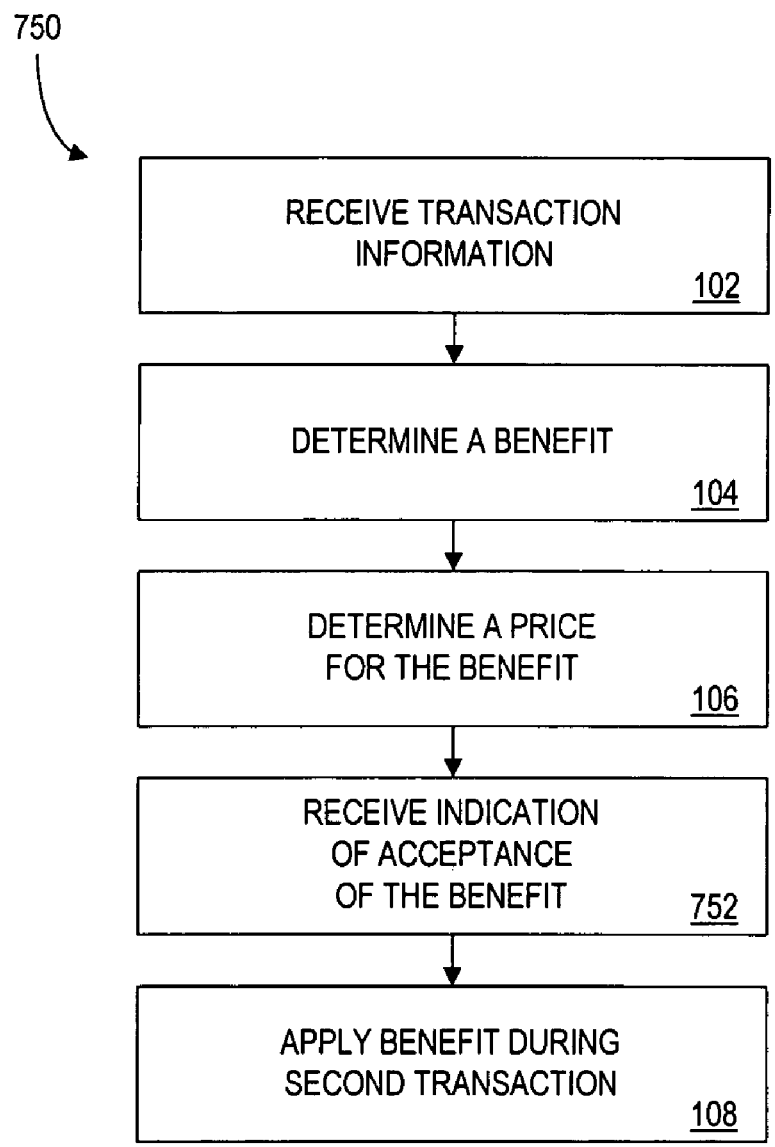
FIG. 12 is a flowchart of a sixth embodiment of a method in accordance with the present invention and usable with the apparatus of FIG. 2.

Now referring to FIG. 12, a sixth embodiment 750 of a method in accordance with the present invention is illustrated. The method 750 includes the steps 102, 104, 106, 108 previously discussed above. In addition, the method 750 includes a step 752 during which the controller 202, a retailer device, a customer device, a customer, a group of people which may or may not include the customer, or some other person, entity or device receives an indication or acknowledgment of an agreement or willingness to purchase the benefit determined during the step 104 for the price determined during the step 106. The indication may be provided by the controller 202, a retailer device, retailer, customer, customer device, etc. In some embodiments, the method 750 may also include one or more of the steps 602, 652, 702, 704 and/or 722 previously described above.

Figure 13:
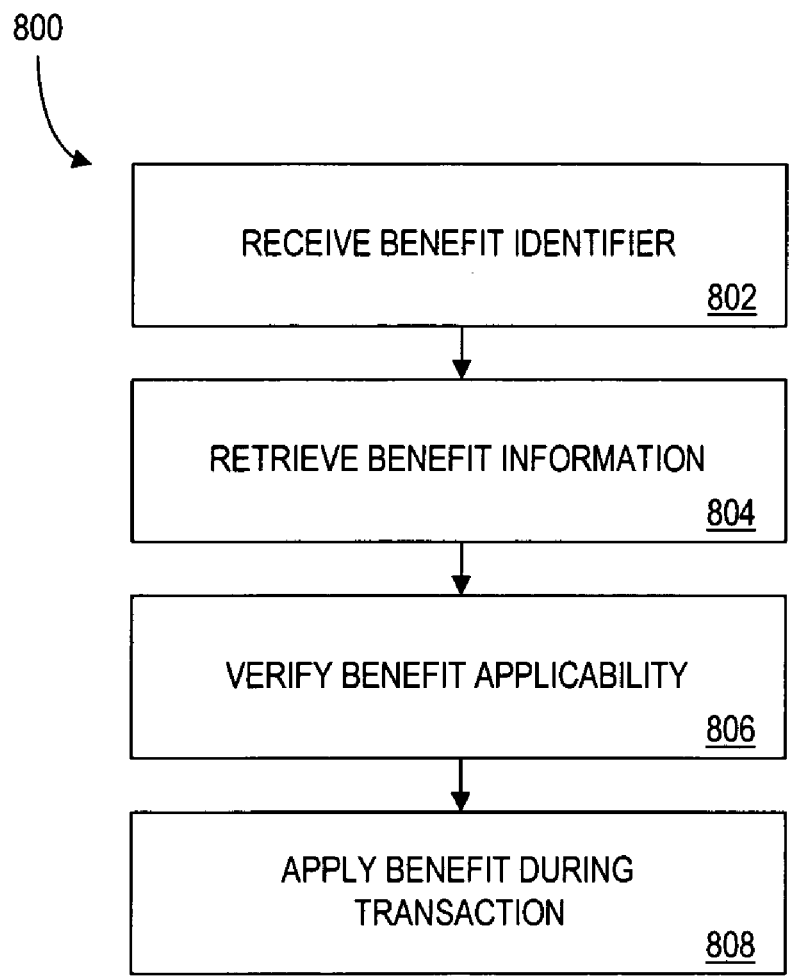
FIG. 13 is a flowchart of a seventh embodiment of a method in accordance with the present invention and usable with the apparatus of FIG. 2.

Now referring to FIG. 13, a seventh embodiment 800 of a method in accordance with the present invention is illustrated. The method 800 may be completed by the controller 202, but is better suited to be completed by a retailer device, such as the retailer device 204 that is completing or be used in a transaction with a customer wherein the customer is using a benefit previously purchased by the customer during a previous transaction. The customer is assumed to have been given a benefit identifier when the customer purchased the benefit during the previous transaction. The benefit identifier and associated benefit information, which may or may not include a customer identifier, preferably are stored in a benefits database when the benefit is purchased by the customer during the previous transaction.

The method 800 includes a step 802 during which the retailer device 204 receives a benefit identifier during or as part of a transaction being conducted by a customer; a step 804 during which the retailer device 204 retrieves or otherwise accesses benefit information for the benefit associated with the benefit identifier received during the step 802, a step 806 during which the applicability or usability of the benefit associated with the benefit identifier received during the step 802 is verified, and a step 808 during which the retailer device 204 applies the benefit associated with the benefit identifier received during the step 802. Each of the steps 802, 804, 806, 808 will be discussed in more detail below.

The retailer device 204 may receive a benefit identifier during the step 802 in many ways. For example, the customer, a check-out clerk, retailer employee, etc. may manually or audibly enter a benefit identifier via an input device on the retailer device 204. Alternatively, if the customer is using a portable customer device, such as a personal digital assistant, the customer may transmit an electromagnetic signal representative of the benefit identifier that is detected or received by the retailer device 204. As another example, the benefit identifier may be included in an email message or other electronic communication sent to the retailer device 204 from the customer or a customer device.

In some embodiments, the retailer device 204 may receive a customer identifier. In such embodiments, the retailer device 204 can access a benefits database, such as the benefits database 266 previously described above, and determine a benefit identifier associated with the customer identifier, thereby allowing the retailer device 204 to complete the step 802. Of course, the benefits database for such embodiments must contain both a benefit identifier and an associated customer identifier, or vice versa.

During the step 804 the retailer device 204 retrieves or otherwise obtains benefit information associated with the benefit identifier received during the step 802. The retailer device 204 may access or query a benefits database, such as the benefits database 266 previously described above, to obtain the desired benefit information. In some embodiments, the customer does not need to be identified by or to the retailer device 204 during the transaction, so long as the benefit identifier is available.

During the step 806, the retailer device 204 verifies that the benefit associated with the benefit identifier received during the step 802 can be used or applied during the current transaction being conducted by the customer. For example, the retailer device 204 may verify that the benefit has not expired, that the customer has completed any qualifying actions required as part of a price that the customer paid for the benefit, that the retailer has the authority to apply or redeem the benefit, etc. In some embodiments where the benefit provides a guaranteed price for a product being purchased by the customer during the transaction, the retailer device 204 may determine if the current retail price is lower than the guaranteed price, thereby making the benefit unnecessary and allowing the customer an opportunity to use the benefit at a later time if the product's price increases over the customer's guaranteed price.

Assuming that the benefit can be used or applied on the customer's behalf during the current transaction as part of the step 808. If the benefit cannot or should not be applied during the current transaction, the retailer device 204 may indicate such to the customer or to a check-out clerk or store employee at the retailer device. In some embodiments that retailer device 204 may update or caused to be updated the benefits database to reflect that the benefit has been applied or redeemed.

The foregoing description is considered as illustrative only of the principles of the invention. Furthermore, since numerous modifications and changes will readily occur to those skilled in the art, it is not desired to limit the invention to the exact construction and process shown and described above. Accordingly, all suitable modifications and equivalents may be resorted to falling within the scope of the invention as defined by the claims which follow. Further, even though only certain embodiments have been described in detail, those having ordinary skill in the art will certainly understand that many modifications are possible without departing from the teachings thereof. All such modifications are intended to be encompassed within the following claims.

The present invention may be embodied as a computer program developed using an object oriented language that allows the modeling of complex systems with modular objects to create abstractions that are representative of real world, physical objects and their interrelationships. However, it would be understood by one of ordinary skill in the art that the invention as described herein can be implemented in many different ways using a wide range of programming techniques as well as general purpose hardware systems or dedicated controllers. In addition, many, if not all, of the steps for the methods described above are optional or can be combined or performed in one or more alternative orders or sequences without departing from the scope of the present invention and the claims should not be construed as being limited to any particular order or sequence, unless specifically indicated.

While specific implementations and hardware configurations for the controller 202 and the retailer device 204 have been illustrated, it should be noted that other implementations and hardware configurations are possible and that no specific implementation or hardware configuration is needed. Therefore, many different types of implementations or hardware configurations can be used in the system 200 and with the methods 100, 600, 650, 700, 750 are not limited to any specific hardware configuration or implementation.

Each of the methods described above can be performed on a single computer, computer system, microprocessor, etc. In addition, two or more of the steps in each of the methods described above could be performed on two or more different computers, computer systems, microprocessors, etc., some or all of which may be locally or remotely configured. The methods can be implemented in any sort or implementation of computer software, program, sets of instructions, code, ASIC, or specially designed chips, logic gates, or other hardware structured to directly effect or implement such software, programs, sets of instructions or code. The computer software, program, sets of instructions or code can be storable, writeable, or savable on any computer usable or readable media or other program storage device or media such as a floppy or other magnetic or optical disk, magnetic or optical tape, CD-ROM, DVD, punch cards, paper tape, hard disk drive, ZIP™ disk, flash or optical memory card, microprocessor, solid state memory device, RAM, EPROM, or ROM.

The term "computer-readable medium" as used herein refers to any medium that directly or indirectly participates in providing instructions to a processor for execution. Such a medium may take many forms, including but not limited to, non-volatile media, volatile media, and transmission media. Non-volatile media include, for example, optical or magnetic disks. Volatile media include dynamic random access memory (DRAM), which typically constitutes the main memory. Transmission media include coaxial cables, copper wire and fiber optics, including the wires that comprise a system bus coupled to a processor. Transmission media can also take the form of acoustic, electrical or electromagnetic waves, such as those generated during radio frequency (RF) and infrared (IR) data communications.

The connections or communications between retailer devices, customer devices, the controller 202, etc. discussed herein is only meant to be generally representative of cable, computer, telephone, or other communication or data networks and methods for purposes of elaboration and explanation of the present. The connections are also intended to be representative of, and include all or a part of, the Internet, the World Wide Web, and other privately or publicly operated networks, including wide area networks, local area networks, data communication networks or connections, intranets, routers, satellite links or networks, microwave links or networks, cellular telephone or radio links, fiber optic transmission lines, ISDN lines, T1 lines, DSL, etc. In addition, as used herein, the terms "computer," "user device," "terminal," "client," "customer device" and "client device" are generally interchangeable and are meant to be construed broadly and to include, but not be limited to, all clients, client devices or machines, personal digital assistants and palm top computers, cash registers, terminals, computers, point-of-sale devices, processors, servers, etc. connected or connectable to a computer or data communications network and all devices on which Internet-enabled software, such as the NETSCAPE COMMUNICATOR™ or NAVIGATOR™ browsers, MOSIAC™ browser, or MICROSOFT INTERNET EXPLORER™ browsers, can operate or be run. The term "browser" should also be interpreted as including Internet-enabled software and computer or client software that enables or allows communication over a computer or communications network and Internet-enabled or World Wide Web enabled, monitored, or controlled devices such as WebTV™ devices, household appliances, phones, etc.

The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

What is claimed is:

1. A method for conducting a transaction, comprising:
   determining at least one product being purchased by a customer during a first transaction;
   determining a first transaction price for said at least one product being purchased during said first transaction;
   offering said customer an opportunity to purchase said at least one product during a second transaction for a second transaction price that is equivalent to said first transaction price;
   receiving an acceptance of said offer from said customer;
   receiving, from said customer, a payment for the opportunity, wherein the payment comprises a price that is different than the first or second transaction prices; and
   allowing said customer to purchase said product during said second transaction for said second transaction price.

2. The method of claim 1, further comprising:
   providing said customer a benefit identifier associated with said at least one product.

3. The method of claim 2, further comprising:
   receiving said benefit identifier during said second transaction.

4. The method of claim 3, further comprising:
   determining a benefit based on said benefit identifier.

5. A method for conducting a transaction, comprising:
   determining at least one product being purchased by a customer during a first transaction;
   determining a first transaction price for said at least one product being purchased during said first transaction;
   providing said customer a benefit during said first transaction, wherein said benefit allows said customer to purchase said at least one product during a second transaction for a second transaction price that is equivalent to said first transaction price;
   charging said customer for a cost of the benefit, wherein the charging is for an amount that is different than the first or second transaction prices; and
   allowing said customer to purchase said product during said second transaction for said second transaction price.

6. A method for conducting a transaction, comprising:
   determining at least one product being purchased by a customer during a first transaction;
   determining a first price for said at least one product being purchased during said first transaction;
   providing said customer a benefit for a second price during said first transaction, wherein said benefit allows said customer to purchase said at least one product during a second transaction for an amount equivalent to said first price;
   charging the second price for the benefit to the customer, wherein the second price is different than the first price; and
   allowing said customer to purchase said product during said second transaction for said amount equivalent to said first price.

7. A method, comprising:
   determining a first price for which a first unit of a product is being purchased as part of a first transaction at a point of sale terminal;
   determining a benefit, in which the benefit comprises a guarantee that no more than the first price for a second unit of the product will be charged if the second unit of the product is purchased as part of a second transaction;
   outputting, at the point of sale terminal, an offer to sell the benefit for a second price, wherein the second price is different than the first price; and
   charging a customer that is purchasing the first unit of the product for the second price if the customer accepts the offer.

8. The method of claim 7, further comprising:
   outputting, to the customer, a document that entitles the customer to be charged the first price for a second unit of the product.

9. The method of claim 8, further comprising:
   receiving the document from the customer during a second transaction.

10. The method of claim 9, further comprising:
    determining a current shelf price for the second unit of the product; and
    charging the customer, for the second unit of the product, the lesser of the current shelf price and the first price.

11. A method, comprising:
    determining a purchase total for a first transaction being conducted at a point of sale terminal, the transaction including a plurality of products;
    determining a benefit, in which the benefit comprises a guarantee that an amount that is not greater than the purchase total will be charged for the plurality of products during a second transaction;
    outputting, at the point of sale terminal, an offer to sell the benefit for a price, wherein the price is different than the purchase total; and
    charging the price to a customer participating in the first transaction if the customer accepts the offer.

12. A method comprising:
    determining a purchase total for a first transaction being conducted at a point of sale terminal;
    determining an amount of savings received by a customer participating in the first transaction;
    determining a benefit, in which the benefit comprises a guarantee that no less than the savings will be received by the customer during a second transaction;
    outputting, at the point of sale terminal, an offer to sell the benefit for a price, wherein the price is different than the purchase total; and
    charging the price to the customer if the customer accepts the offer.

13. The method of claim 12, wherein the guarantee comprises a guarantee that no less than the savings will be received by the customer during a second transaction if the customer purchases the same products in the second transaction as are included in the first transaction.

14. An apparatus, comprising:
    a processor; and
    a storage device in communication with said processor and storing instructions, wherein said processor is adapted to execute said instructions to:
    determine at least one product being purchased by a customer during a first transaction;
    determine a first transaction price for said at least one product being purchased during said first transaction;

offer said customer an opportunity to purchase said at least one product during a second transaction for a receive an acceptance of said offer from said customer;

receive, from said customer second transaction price that is equivalent to said first transaction price; a payment for the opportunity, wherein the payment comprises a price that is different than the first or second transaction prices; and allow said customer to purchase said product during said second transaction for said second transaction price.

15. A computer-readable medium storing instructions adapted to be executed by a processor, which when executed by said processor cause said processor to implement a method, comprising:

determining at least one product being purchased by a customer during a first transaction;

determining a first transaction price for said at least one product being purchased during said first transaction;

offering said customer an opportunity to purchase said at least one product during a second transaction for a second transaction price that is equivalent to said first transaction price;

receiving an acceptance of said offer from said customer;

receiving, from said customer, a payment for the opportunity, wherein the payment comprises a price that is different than the first or second transaction prices; and allowing said customer to purchase said product during said second transaction for said second transaction price.

16. An apparatus, comprising:

a processor; and a storage device in communication with said processor and storing instructions, wherein said processor is adapted to execute said instructions to:

determine at least one product being purchased by a customer during a first transaction;

determine a first transaction price for said at least one product being purchased during said first transaction;

provide said customer a benefit during said first transaction, wherein said benefit allows said customer to purchase said at least one product during a second transaction for a second transaction price that is equivalent to said first transaction price;

charge said customer for a cost of the benefit, wherein the charging is for an amount that is different than the first or second transaction prices; and allow said customer to purchase said product during said second transaction for said second transaction price.

17. A computer-readable medium storing instructions adapted to be executed by a processor, which when executed by said processor cause said processor to implement a method, comprising:

determining at least one product being purchased by a customer during a first transaction;

determining a first transaction price for said at least one product being purchased during said first transaction;

providing said customer a benefit during said first transaction, wherein said benefit allows said customer to purchase said at least one product during a second transaction for a second transaction price that is equivalent to said first transaction price;

charging said customer for a cost of the benefit, wherein the charging is for an amount that is different than the first or second transaction prices; and allowing said customer to purchase said product during said second transaction for said second transaction price.

18. A method, comprising:

determining a product being purchased by a customer during a first transaction;

determining a product price associated with the customer's purchase of the product during the first transaction;

providing a benefit to the customer during the first transaction, wherein the benefit allows the customer to purchase the product during a second transaction for a second price that is equivalent to the first price;

charging the customer for the benefit, wherein the charging is for an amount that is different than the first or second prices;

determining, during the second transaction and on behalf of the customer, that a current price of the product is less then or equal to the second price; and providing an indication, based on the determining that the current price of the product is less then or equal to the second price, that the benefit should be saved for a future transaction.

* * * * *